(12) United States Patent
Schoon et al.

(10) Patent No.: US 8,056,662 B2
(45) Date of Patent: Nov. 15, 2011

(54) LUBRICATION SYSTEM FOR RIGHT-ANGLE DRIVES USED WITH UTILITY VEHICLES

(75) Inventors: Benjamin Warren Schoon, Lafayette, IN (US); James R. Dammon, W. Lafayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 880 days.

(21) Appl. No.: 11/948,657

(22) Filed: Nov. 30, 2007

(65) Prior Publication Data
US 2008/0230289 A1  Sep. 25, 2008

Related U.S. Application Data

(63) Continuation-in-part of application No. 11/690,785, filed on Mar. 23, 2007.

(51) Int. Cl.
*B60K 1/02* (2006.01)
(52) U.S. Cl. .................. 180/65.6; 180/245; 180/251
(58) Field of Classification Search ............ 180/65.5, 180/65.6, 251, 233, 245, 357, 124.117; 74/417; 475/160
See application file for complete search history.

(56) References Cited

U.S. PATENT DOCUMENTS

| | | | |
|---|---|---|---|
| 1,570,356 A | 1/1926 | Lane | |
| 1,869,776 A * | 8/1932 | Randolph et al. | 184/4 |
| 2,191,221 A * | 2/1940 | Poole | 310/164 |
| 2,258,077 A * | 10/1941 | Taylor | 184/6.12 |
| 2,263,936 A * | 11/1941 | Taylor | 184/6.12 |
| 2,336,513 A * | 12/1943 | Taylor | 477/123 |
| 2,417,957 A * | 3/1947 | Taylor | 475/312 |
| 2,574,986 A * | 11/1951 | Schou | 475/253 |
| 2,638,173 A * | 5/1953 | Dunham | 180/21 |
| 2,950,773 A * | 8/1960 | Ulinski | 180/21 |
| 3,214,989 A | 11/1965 | Wellauer et al. | |
| 3,767,013 A | 10/1973 | Caldwell | |
| 3,770,074 A * | 11/1973 | Sherman | 180/65.6 |

(Continued)

FOREIGN PATENT DOCUMENTS
DE  1450724 A1  2/1969
(Continued)

OTHER PUBLICATIONS

Schoon, PCT/US2008/056337, International Search Report, Jun. 9, 2009.

(Continued)

*Primary Examiner* — Paul N Dickson
*Assistant Examiner* — Bridget Avery
(74) *Attorney, Agent, or Firm* — Woodling, Krost and Rust

(57) ABSTRACT

A bearing lubrication device in a right angle gear reducer includes a gear housing having an interior portion and a lubricating fluid reservoir therein. An oil slinger, rotating pinion shaft, pinion shaft housing, and bearings for supporting the pinion shaft within the pinion shaft housing work together to provide a continuous supply of oil to the bearings. The pinion shaft includes two radially and longitudinally extending passageways therethrough which supply oil from a recess in one end of the pinion shaft to the bearings. Oil is slung from the reservoir into the recess of the rotating pinion shaft where it is forced outwardly and through the passageways to a chamber formed by the rotating pinion shaft, shaft housing and bearings. The roller bearings pump the oil from the chamber back to the fluid reservoir. Oil passageways in the shaft housing enable the return of oil from one bearing set.

14 Claims, 20 Drawing Sheets

U.S. PATENT DOCUMENTS

| | | | |
|---|---|---|---|
| 3,796,108 A * | 3/1974 | Kime et al. | 74/417 |
| 3,798,991 A * | 3/1974 | Kime et al. | 74/417 |
| 3,848,702 A | 11/1974 | Bergman | |
| 3,857,301 A * | 12/1974 | Hanks et al. | 475/332 |
| 4,018,097 A | 4/1977 | Ross | |
| 4,031,780 A | 6/1977 | Dolan et al. | |
| 4,050,544 A | 9/1977 | Kalyan et al. | |
| 4,051,922 A | 10/1977 | Sukle | |
| 4,057,126 A | 11/1977 | Stephens | |
| 4,090,588 A | 5/1978 | Willover | |
| 4,121,694 A | 10/1978 | Nelson | |
| 4,170,549 A | 10/1979 | Johnson | |
| 4,217,794 A * | 8/1980 | Yasui et al. | 475/160 |
| 4,221,279 A | 9/1980 | Jones et al. | |
| 4,222,283 A | 9/1980 | Nagy | |
| 4,327,950 A | 5/1982 | Czuszak | |
| 4,359,142 A | 11/1982 | Schultz et al. | |
| 4,361,774 A | 11/1982 | Czech | |
| 4,448,552 A | 5/1984 | White et al. | |
| 4,545,332 A | 10/1985 | Suzuki et al. | |
| 4,575,311 A | 3/1986 | Wood | |
| 4,588,385 A | 5/1986 | Suzuki et al. | |
| 4,616,736 A | 10/1986 | Fox | |
| 4,656,885 A * | 4/1987 | Hori et al. | 74/467 |
| 4,683,771 A | 8/1987 | Sogo et al. | |
| 4,683,985 A | 8/1987 | Hultgren | |
| 4,700,808 A | 10/1987 | Haentjens | |
| 4,705,449 A | 11/1987 | Christianson et al. | |
| 4,741,303 A | 5/1988 | Kronich | |
| 4,762,471 A | 8/1988 | Asanuma et al. | |
| 4,763,031 A | 8/1988 | Wang | |
| 4,766,859 A | 8/1988 | Miyaki et al. | |
| 4,803,897 A | 2/1989 | Reed | |
| 4,952,077 A | 8/1990 | Kurt | |
| 4,962,821 A | 10/1990 | Kim | |
| 4,987,974 A | 1/1991 | Crouch | |
| 5,024,636 A | 6/1991 | Phebus et al. | |
| 5,161,644 A | 11/1992 | Swenskowski et al. | |
| 5,333,704 A | 8/1994 | Hoff | |
| 5,340,273 A | 8/1994 | Rockwood | |
| 5,453,181 A | 9/1995 | Dahlback et al. | |
| 5,478,290 A | 12/1995 | Buuck et al. | |
| 5,480,003 A | 1/1996 | Hill et al. | |
| 5,489,013 A | 2/1996 | Buuck et al. | |
| 5,505,112 A | 4/1996 | Gee | |
| 5,558,180 A | 9/1996 | Yanagisawa | |
| 5,591,018 A | 1/1997 | Takeuchi et al. | |
| 5,601,155 A | 2/1997 | Gardner | |
| 5,616,097 A | 4/1997 | Dammon | |
| 5,630,481 A | 5/1997 | Rivard | |
| 5,634,530 A | 6/1997 | Maekawa et al. | |
| 5,662,188 A | 9/1997 | Ito et al. | |
| 5,667,036 A | 9/1997 | Mueller et al. | |
| 5,699,877 A | 12/1997 | Dreier | |
| 5,718,302 A * | 2/1998 | Hasebe et al. | 180/65.6 |
| 5,725,072 A | 3/1998 | Yamamoto et al. | |
| 5,768,954 A | 6/1998 | Grabherr et al. | |
| 5,810,116 A | 9/1998 | Kaptrosky | |
| 5,860,403 A | 1/1999 | Hirano et al. | |
| 5,887,678 A | 3/1999 | Lavender | |
| 5,947,075 A | 9/1999 | Ryu et al. | |
| 6,106,254 A | 8/2000 | Hirooka et al. | |
| 6,139,295 A | 10/2000 | Utter et al. | |
| 6,146,118 A | 11/2000 | Haller et al. | |
| 6,213,078 B1 | 4/2001 | Ryu et al. | |
| 6,213,081 B1 | 4/2001 | Ryu et al. | |
| 6,223,858 B1 | 5/2001 | Ubagai et al. | |
| 6,244,386 B1 | 6/2001 | Takasaki et al. | |
| 6,276,474 B1 | 8/2001 | Ruppert | |
| 6,327,994 B1 | 12/2001 | Labrador | |
| 6,328,123 B1 | 12/2001 | Niemann | |
| 6,374,951 B1 | 4/2002 | Michelhaugh | |
| 6,394,061 B2 | 5/2002 | Ryu et al. | |
| 6,439,208 B1 | 8/2002 | Jones | |
| 6,488,110 B2 | 12/2002 | Price | |
| 6,516,789 B1 | 2/2003 | Jones | |
| 6,588,539 B2 | 7/2003 | Hinton et al. | |
| 6,616,432 B2 | 9/2003 | Sczcepanski et al. | |
| 6,616,567 B2 | 9/2003 | Strong et al. | |
| 6,698,762 B2 | 3/2004 | Newberg et al. | |
| 6,705,555 B1 | 3/2004 | Bratten | |
| 6,810,849 B1 | 11/2004 | Hirsch et al. | |
| 6,852,061 B2 | 2/2005 | Schoon | |
| 6,863,043 B2 | 3/2005 | Kurihara et al. | |
| 6,964,313 B2 | 11/2005 | Phillips, III et al. | |
| 7,243,749 B2 | 7/2007 | Kakinami et al. | |
| 7,455,616 B2 | 11/2008 | Beltkowski | |
| 7,622,836 B2 | 11/2009 | DeVeny et al. | |
| 2003/0032516 A1 | 2/2003 | Gervais, III | |
| 2003/0037737 A1 | 2/2003 | Artola | |
| 2004/0087405 A1 | 5/2004 | Inoue et al. | |
| 2004/0235606 A1 | 11/2004 | Brossard | |
| 2005/0032602 A1 | 2/2005 | Wagle et al. | |
| 2005/0176545 A1 | 8/2005 | Miller et al. | |
| 2005/0178893 A1 | 8/2005 | Miller et al. | |
| 2005/0272551 A1 | 12/2005 | Oates | |
| 2007/0295557 A1 | 12/2007 | Aldridge | |
| 2008/0230284 A1 | 9/2008 | Schoon | |

FOREIGN PATENT DOCUMENTS

| | | |
|---|---|---|
| EP | 0677672 A1 | 10/1995 |
| FR | 2740853 A1 | 5/1997 |
| JP | 60157593 A | 8/1985 |
| JP | 60157593 A | 12/2008 |

OTHER PUBLICATIONS

Schoon, PCT/US2008/056337, Written Opinion of the International Searching Authority, Jun. 9, 2009.

Inventor: Schoon, U.S. Appl. No. 12/629,204; F/D: Dec. 2, 2009; Entitled:Integrated Spindle-Carrier Electric Wheel Drive; 8602.

European Search Report, EP 1 843 056 A3, Application No. EP 06 01 9821, Dec. 12, 2008 Munich.

U.S. Appl. No. 12/255,292, filed Oct. 21, 2008, Schoon, Entire Document.

U.S. Appl. No. 11/399,123, filed Dec. 27, 2007, Aldridge, Entire Document.

U.S. Appl. No. 11/690,785, Schoon, Entire Document.

General Electric EV-1 B,C,D Manual.

Imperial Electric Offset Gearbox Frame 56.

Supplementary European Search Report, EP 08731764, Jun. 15, 2010, Place of Search: Munich.

\* cited by examiner

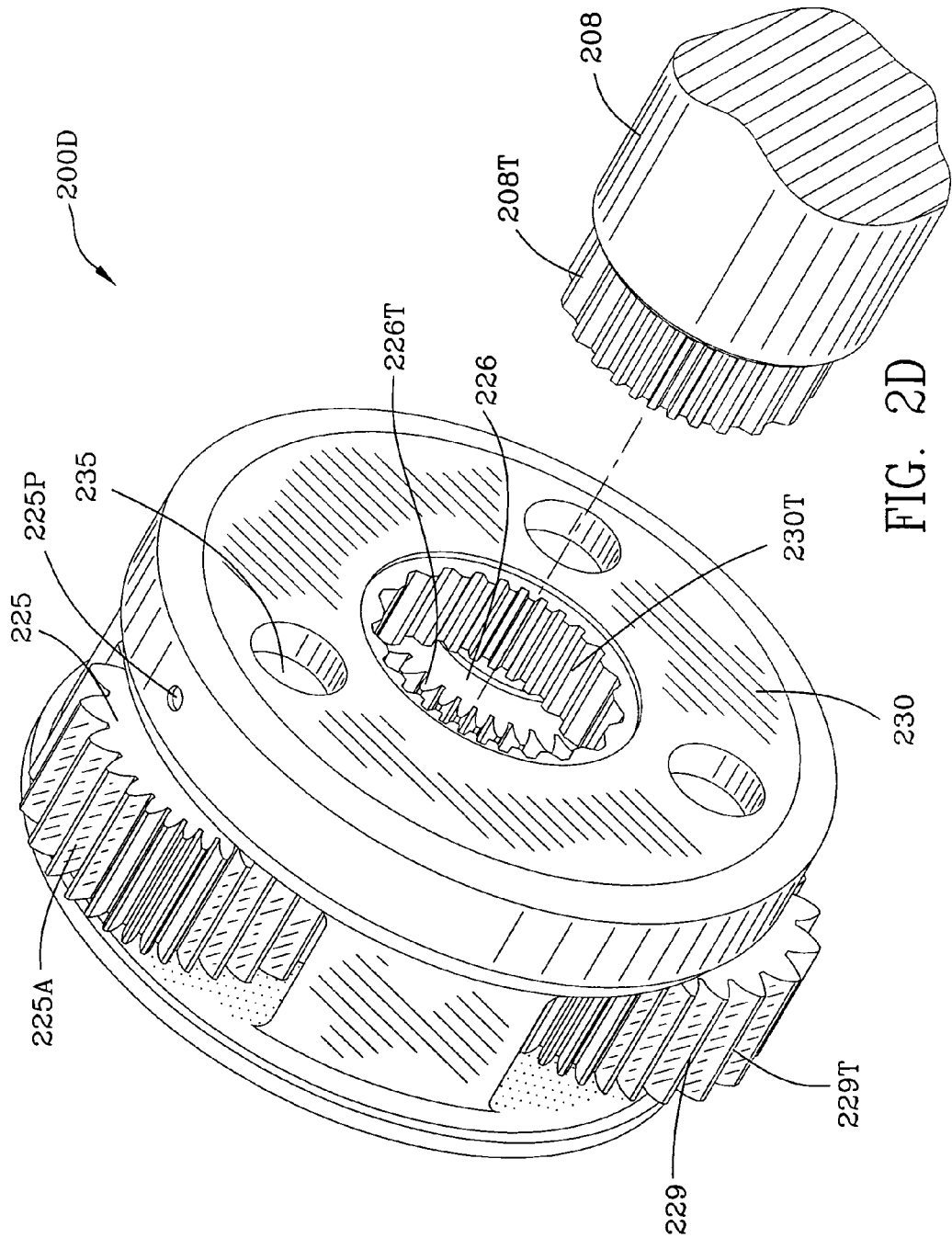

```
                                    ┌─ 300
                                   ╱

┌─────────────────────────────────────────┐
│  ORIENTING AND MOUNTING (TO THE         │
│  VEHICLE) TWO HIGH-SPEED ELECTRIC       │
│  MOTORS SIDE BY SIDE WITH               │
│  OPPOSITELY ORIENTED SHAFT              │
│  MOUNTED PINION GEARS                   │
│                                     301 │
└─────────────────────────────────────────┘
                    │
┌─────────────────────────────────────────┐
│  MOUNTING OFFSET PLANETARY GEAR         │
│  REDUCERS IN ENGAGEMENT WITH THE        │
│  SHAFT DRIVEN PINION GEARS              │
│                                     302 │
└─────────────────────────────────────────┘
                    │
┌─────────────────────────────────────────┐
│  COUPLING AN OUTPUT SHAFT TO THE        │
│  SPLINED OUTPUT OF THE CARRIER          │
│                                     303 │
└─────────────────────────────────────────┘
                    │
┌─────────────────────────────────────────┐
│  DRIVING THE WHEEL SHAFTS OF THE        │
│  VEHICLE                                │
│                                     304 │
└─────────────────────────────────────────┘
```

FIG. 3

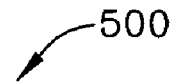

```
┌─────────────────────────────────────┐
│   Slinging oil from a lubricating oil │
│   reservoir using an oil slinger at a │
│   first end of a pinion shaft.   501  │
└─────────────────────────────────────┘
                    │
┌─────────────────────────────────────┐
│    Collecting oil in a cylindrical    │
│    recess in the first end of the     │
│        pinion shaft.           502    │
└─────────────────────────────────────┘
                    │
┌─────────────────────────────────────┐
│     Rotating the pinion shaft and     │
│     forcing the collected oil radially│
│     outwardly in the cylindrical recess│
│         and into a passageway         │
│     communicating with the recess and │
│     extending longitudinally and      │
│     radially from the recess to a     │
│             chamber.           503    │
└─────────────────────────────────────┘
                    │
┌─────────────────────────────────────┐
│    Pumping oil from the chamber       │
│      through the bearings.     504    │
└─────────────────────────────────────┘
                    │
┌─────────────────────────────────────┐
│    Returning the oil to the lubricating│
│           oil reservoir.       505    │
└─────────────────────────────────────┘
```

FIG. 5

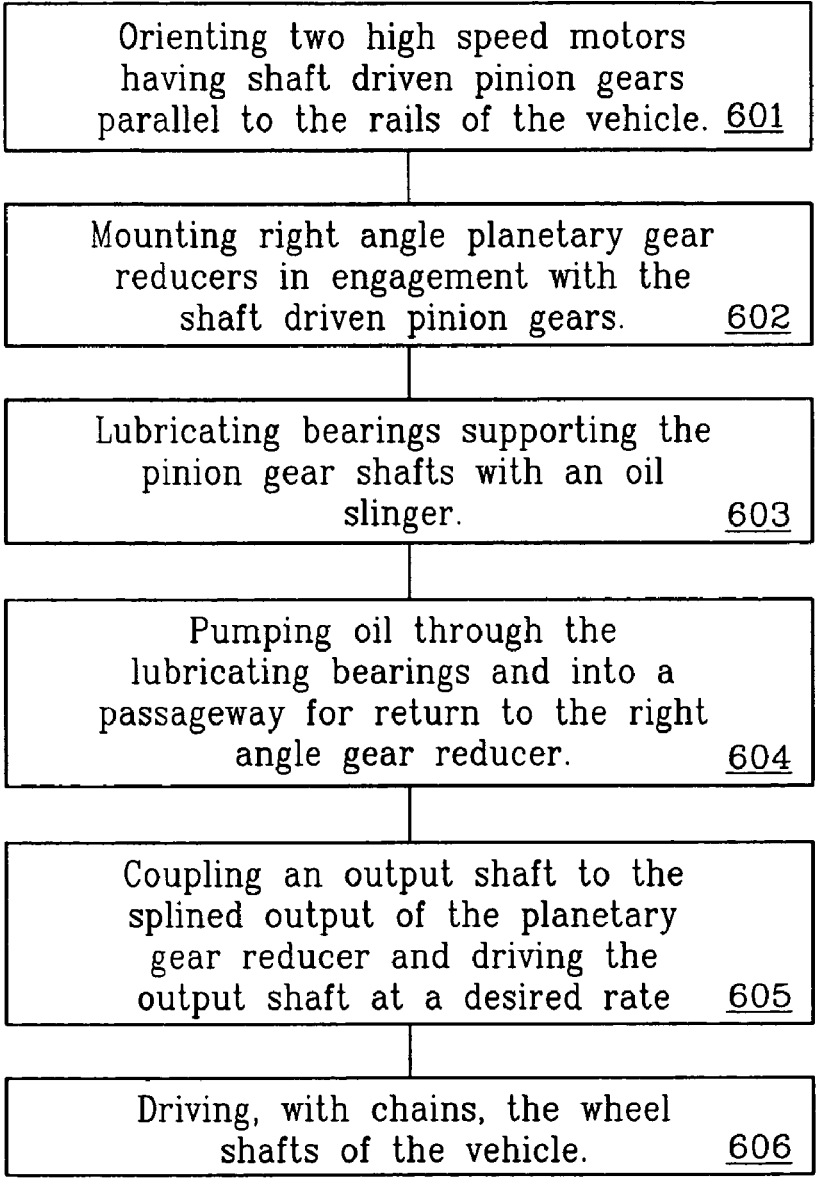

```
┌─────────────────────────────────────┐
│   Orienting two high speed motors   │
│   having shaft driven pinion gears  │
│  parallel to the rails of the vehicle. 601 │
└─────────────────────────────────────┘
                  │
┌─────────────────────────────────────┐
│  Mounting right angle planetary gear│
│    reducers in engagement with the  │
│     shaft driven pinion gears.   602│
└─────────────────────────────────────┘
                  │
┌─────────────────────────────────────┐
│   Lubricating bearings supporting the│
│     pinion gear shafts with an oil  │
│              slinger.            603│
└─────────────────────────────────────┘
                  │
┌─────────────────────────────────────┐
│        Pumping oil through the      │
│    lubricating bearings and into a  │
│  passageway for return to the right │
│         angle gear reducer.      604│
└─────────────────────────────────────┘
                  │
┌─────────────────────────────────────┐
│   Coupling an output shaft to the   │
│    splined output of the planetary  │
│    gear reducer and driving the     │
│    output shaft at a desired rate 605│
└─────────────────────────────────────┘
                  │
┌─────────────────────────────────────┐
│   Driving, with chains, the wheel   │
│       shafts of the vehicle.     606│
└─────────────────────────────────────┘
```

FIG. 6

LUBRICATION SYSTEM FOR RIGHT-ANGLE DRIVES USED WITH UTILITY VEHICLES

This is a continuation-in-part of application Ser. No. 11/690,785 filed Mar. 23, 2007 which is commonly owned. U.S. patent application Ser. No. 11/399,123 filed Apr. 6, 2006 entitled Cascading Oil flow Bearing Lubrication system employs an oil slinger and is commonly owned with the instant patent application.

FIELD OF THE INVENTION

This invention is used to lubricate bearings which support a high speed pinion gear (input gear) mounted in a pinion housing which facilitates use of a right angle-drive (gear reducer) with utility vehicles. The invention is in the field of right-angle drives powered by high speed motors for use in utility vehicles. The right angle drives (gear reducers) are used in, for example, drive systems for utility vehicles but may be used in other applications.

BACKGROUND OF THE INVENTION

Traditionally, Skid-Steer® Loader Machines as made famous by manufacturers such as Bobcat® and the like have been powered almost exclusively by hydraulics. Skid-Steer® is a registered trademark of Arts-way Manufacturing Co., Inc., a Delaware Corporation. Bobcat® is a registered trademark of Clark Equipment Company of New Jersey.

These machines traditionally have gasoline or diesel internal combustion engines that drive a hydraulic pump. The pump usually provides power to two independently controlled hydraulic motors one for each side of the machine. The output of each motor drives a drive sprocket with two sets of sprocket teeth. One set of sprocket teeth drives a chain that goes to a front wheel sprocket and the other set of sprocket teeth drives a chain that goes to the rear wheel sprocket. The hydraulic pump also provides power for lifting functions and power takeoffs for implements that can be connected to the machine.

U.S. Pat. No. 4,705,449 to Christianson et al. discloses the use of two electric traction motors. FIG. 1 is a plan view of an electric drive system of U.S. Pat. No. 4,705,449 to Christianson et al. wherein battery 28 supplies electric power to two traction motors 60, 64 which in turn are coupled 84 to a gear reducer 82. Specifically, the '449 patent states at col. 4 line 10 et seq.: "a first traction motor 60 provides the motive force for the left-hand side of the vehicle and a second traction motor 64 provides the motive force for a right-hand side of the vehicle 66. Both the first traction motor 60 and the second traction motor 64 are powered by a battery pack 28 . . . . Similarly, the traction motor 64 is connected to a spur gear reduction assembly 82 through a coupling 84. The spur gear reduction assembly engages a chain 86 which in turn engages a right rearward gear 74 and left forward gear 90, which are respectively connected to wheels 14a and 14b through axles 92 and 94. As will be appreciated, the traction motor 60 is operated independently of the traction motor 64 thereby permitting the wheels 14c, 14d to operate at different speed than wheels 14a and 14b to create skid steering.".

U.S. Pat. No. 4,705,449 to Christianson et al. discloses the use of two electric traction motors. The motors are not identified by type in Christianson et al as either DC or AC. However, the motors are DC electric motors as they are controlled by a device identified in the '449 patent to Christianson, namely, a General Electric EV 1 SCR Controller, which is designed to control DC motors. The General Electric EV 1 SCR Controller describes the use of rectifiers to pulse power to DC motors and has no provision for the control of AC motors.

A copy of the EV 1 SCR Controller technical literature is submitted herewith in an Information Disclosure Statement and describes the use of the controller as being for the control of DC motors. Additionally, the EV 1 SCR Controller is identified in U.S. Pat. No. 4,265,337 to Dammeyer entitled Fork Lift Truck Speed Control Upon Fork Elevation and is used to control a DC motor 92.

Additionally, the EV 1 SCR Controller has been used in numerous automobiles (electric vehicles) in conjunction with DC series wound motors which provide high current and high torque at low rpm.

DC traction motors have been used in applications involving forklifts and similar vehicles in the past. Internal combustion engines are not favored in such applications because an internal combustion engine produces zero torque at zero engine speed (RPM) and reaches its torque peak later in its operating range. Internal combustion engines generally require a variable-ratio transmission between the engine and the wheels to match engine speed to the road speeds and loads encountered. A clutch must be provided so that the engine can be mechanically decoupled from the wheels when the vehicle stops. Additionally, some slippage of the engine with respect to the drive train occurs while starting from a stop. Direct current electric traction motors produce considerable torque at zero RPM and thus may be connected directly to the wheels. Alternating current motors, hydraulic motors and pneumatic motors also produce torque at zero RPM.

Although the term traction motor is usually referred to in the context of a direct current motor, the term is also applicable to alternating current motor applications as well. Additionally, the term traction motor is used to describe any motor of whatever type used to supply torque and power to a vehicle's wheel, tracks, etc.

In small utility vehicles and the like, space is an important consideration in the design of the vehicle. It is therefore desirable to use a small motor, electric, hydraulic, or pneumatic which is capable of supplying required torque and horsepower under all operating conditions. If an electric motor is used it may be an alternating current motor or it may be a direct current motor.

Generally, for a given power, high speed electric motors are smaller in size, lighter in weight, and less expensive than low speed motors. Generally, for a given power, alternating current motors are smaller than direct current motors.

It is highly desirable to save space, weight and cost in the powertrain of a utility vehicle through the use of a high speed motor so that the space may be used for batteries, controls or other components. It is further highly desirable to save space, weight and cost in the powertrain of a utility vehicle or similar vehicle through the use of a high speed motor. Space may be conserved for other components of the vehicle and, in doing so, it is necessary to dissipate large amounts of heat from pinion shaft support bearings. The pinion shaft may rotate at 6000-7000 rpm or higher depending upon the application. At these rotational speeds considerable heat is generated in the bearings. A high speed input from a small electric motor in combination with a right-angle gear reducer saves space while maintaining performance torque and horsepower requirements.

Previously, external or internal oil pumps have been used in gear reducers to lubricate bearings which support high rotational speed shafts and gears. These devices are powered by one of the shafts within the gear housing or casing. While satisfactory performance has been achieved with the shaft-driven oil pumps, more parts are necessary to accomplish lubrication of the bearings of the high speed shaft. Higher speed shafts generate more heat which must be dissipated. External pumps necessitate passageways through the pump casing to bring oil to bearings and gears.

U.S. patent application Ser. No. 11/399,123 filed Apr. 6, 2006 entitled Cascading Oil flow Bearing Lubrication system employs an oil slinger and is commonly owned with the instant patent application. A bearing lubrication device which includes an output shaft carrier housed within a gear housing is disclosed and claimed. The output shaft resides partially within the output shaft carrier and upper and lower bearings support the output shaft. The output shaft carrier includes a first trough for catching lubricating fluid which is slung by an oil slinger. The first trough is in lubricating fluid communication with the upper bearing which pumps the lubricating fluid through the bearing and into an upper passageway which terminates in an opening from which the lubricating fluid emanates.

U.S. Pat. No. 5,887,678 to Lavender discloses a lubrication apparatus for shaft bearings which includes a trough extending radially outwardly and inclined downwardly in a direction toward the shaft bearing. U.S. Pat. No. 6,439,208 to Jones discloses a centrifugal supercharger having a lubricating slinger. U.S. Pat. No. 6,698,762 to Newberg et al. discloses a rotary device shaft with oil slinger groove. United States Patent Application Publication No. US 2003/0159888 A1 to Burkholder discloses a disk oil slinger assembly. United States Patent Application Publication No. US 2006/0104838 A1 to Wood discloses an integrated eccentric flywheel slinger.

None of the foregoing references provide pinion shaft bearing lubrication in a right angle gear reducer using an oil slinger, pinion shaft and pinion housing configured for use in a utility vehicle.

None of the foregoing references disclose a right angle gear reducer which includes the an oil slinger lubrication system in conjunction with a utility vehicle.

SUMMARY OF THE INVENTION

A bearing lubrication device in a right angle gear reducer includes a gear housing having an interior portion and a lubricating fluid reservoir therein. The principles and structure disclosed herein may be used in a gear reducer whether or not it is denoted as a right-angle gear reducer. An oil slinger, rotating pinion shaft, pinion shaft housing, and bearings for supporting the pinion shaft within the pinion shaft housing work together to provide a continuous supply of oil to the bearings. The pinion shaft includes first and second radially and longitudinally extending passageways therethrough which supply oil from a recess in the nose end of the pinion shaft to the bearings. Oil is slung from the reservoir into the recess of the rotating pinion shaft where it is forced centrifugally outwardly in the cylindrical recess and forced centrifugally through the radially and longitudinally extending passageways to an oil supply chamber formed by the rotating pinion shaft, shaft housing and bearings. Tapered roller bearings pump the oil from the oil supply chamber back to the oil reservoir. Oil passageways in the shaft housing enable the return of oil from the first bearing set while the other bearing set returns the oil directly to the reservoir. In this way a very compact and efficient gear reducer is produced having a shaft driven oil slinger which is compact and minimizes the number of parts necessary.

A method for lubricating bearings supporting a shaft in a gear box is disclosed and comprises the steps of: slinging oil from a lubricating oil reservoir using an oil slinger toward a first end of a pinion shaft; collecting oil in a cylindrical recess in the first end of the pinion shaft; rotating the shaft and forcing the collected oil radially outwardly in the cylindrical recess and into a passageway communicating with the recess and extending longitudinally and radially from the recess to the oil supply chamber formed by the shaft, the bearings and the shaft housing; pumping oil from the chamber through the bearings; and, returning the oil to the lubricating oil reservoir. Additionally, the step of returning the oil pumped from the oil return chamber to the lubricating oil reservoir is performed using a return passageway through the shaft housing.

The right-angle drive described herein is particularly useful in a utility vehicle. The vehicle includes: a frame; a high speed motor having an output shaft; a right-angle gear reducer driven by the output shaft of the high speed motor; the right-angle gear reducer includes a bearing lubrication device comprising: a gear housing having an interior portion and a lubricating fluid reservoir therein; an oil slinger; a pinion shaft; a pinion shaft housing; a bearing for supporting the pinion shaft within the pinion shaft housing; the pinion shaft includes a passageway therethrough; and, the oil slinger supplies oil to the passageway communicating the oil to the bearing by way of an oil supply chamber; the right-angle gear reducer includes an output carrier interconnected with an output shaft; the output shaft includes first and second chain drive sprockets; the forward and rearward wheel shafts each have a wheel sprocket; a first and second chain; the first chain interengaging the first chain drive sprocket and the forward wheel sprocket driving the forward wheel shaft; and, the second chain interengaging the second chain drive sprocket and the rearward wheel sprocket driving the rearward wheel shaft.

Another method for using a high-speed motor in a utility vehicle is disclosed. The method includes the steps of: orienting two high speed motors having shaft driven pinion gears parallel to the rails of the vehicle; mounting right angle planetary gear reducers in engagement with said shaft driven pinion gears, each of the planetary gear reducers include a gear driven by said shaft driven pinion gears, the gear driven by said shaft driven pinion gear drives a shaft which includes a second pinion gear which drives a planetary gear set and carrier reacting against a ring gear in the casing of the planetary gear reducer, the carrier of the planetary gear reducer includes a splined output, and each of the splined outputs being on the same axis; lubricating bearings supporting the pinion gear shafts with an oil slinger, the pinion gear shafts include a nose portion having a recess, at least one port, and at least one radially and longitudinally extending passageway communicating lubricating oil to a supply chamber feeding the lubricating bearings; pumping oil through the lubricating bearings and into a passageway for return to the right angle gear reducer; coupling an output shaft to the splined output of the planetary gear reducer and driving the output shaft at a desired rate; and, driving, with chains, the wheel shafts of the vehicle.

As electric motor technology has advanced to provide more performance for less cost it makes sense to replace hydraulic systems with electric systems. Electric motors typically rotate at much higher RPM than hydraulic motors, particularly those suitable for skid-steer loaders. It is desirable to minimize the size of the drive train components so as to maximize the space available for batteries and controls. The vehicle described herein may employ Nickel Metal Hydride, Lithium Ion, Lithium Ion polymer, lead acid batteries or other battery technology.

Although one example of the invention as described herein uses high speed alternating current electric motors it is specifically contemplated that the invention may be used with high speed direct current electric motors, high speed hydraulic motors and high speed pneumatic motors.

In one example, the input to the gear box is an offset helical gear driven by a pinion. A planetary sun pinion inputs to the planetary stage. Planetary gear sets provide torque multiplication in compact packages. The output of the gear box is a carrier with a planetary gear-set reduction including a stationary ring gear. The gear box casing includes a ring gear which is a reaction gear and intermeshes with a three-gear planetary set. The carrier of the planetary gear set includes a spline which intermeshes with a splined output shaft.

The offset reduction in the gearbox is an important aspect of the invention as it enables the electric motors to be placed side to side. Use of electric motors is enabled in this application by offsetting the gear box. In this way the left and right side motors can be mounted side-by-side without interference while still maximizing available space for other components such as batteries and controls.

In another example, the offset gear box may be oriented differently (i.e., rotated 180 degrees) with the motors side by side. Although this example may result in reducing the width of the vehicle it may also result in increasing the length of the vehicle. Still alternatively, this example may be used to drive one of the wheel shafts directly.

A wheel driven utility vehicle includes a frame and two high speed alternating current electric motors arranged side by side for driving the vehicle. A variable frequency alternating current drive is utilized to control the speed of the motors and hence to control the direction and turning of the utility vehicle. Instead of high speed alternating current motors, high speed direct current motors, high speed hydraulic motors and/or high speed pneumatic motors may be used.

Each alternating current motor has an output which drives an offset planetary gear reducer. Each offset planetary gear reducer is affixed to the electric motor (or other motor type) and includes an output carrier interconnected with an output shaft. Each output shaft includes first and second chain drive sprockets which drive chains interconnected with shafts driving the front and rear wheels respectively. Each offset planetary gear reducer enables use of space saving high speed relatively low-torque alternating current electric motors (or other motors with similar performance characteristics) with attendant large speed reductions. Gear reduction enables the production of sufficient torque at the wheels of the vehicle. Applications in addition to utility vehicles are also specifically contemplated.

In an example of the invention, a utility vehicle drive system comprises two alternating current electric motors (or other high speed motors with similar performance characteristics) each having a shaft driven pinion gear. Intermediate gears engage shaft driven pinion gears which in turn drive planetary gears. Each of the planetary gear reducers include an output spline and each of the output splines are axially aligned with each other.

In an example of the invention, a method for using a high-speed electric motor (or high-speed hydraulic, pneumatic or direct current motors) in a utility vehicle includes the step of orienting the motors having shaft driven pinion gears side by side such that their shaft driven pinion gears are arranged on opposite sides of the vehicle. Next, the offset planetary gear reducers are mounted in engagement with the shaft driven pinion gears. Each of the planetary gear reducers include a gear driven by the shaft driven pinion gear. The gear driven by the shaft driven pinion gears includes a shaft portion formed as a second pinion sun gear which drives a planetary gear set and carrier. The planetary gear set reacts against a ring gear in the casing of the planetary gear reducer. The carrier of the planetary gear reducer includes a splined output. Each of the splined outputs are on the same axis of the other splined output located on the other side of the vehicle. Additionally, the method includes driving an output shaft coupled to the splined output of the carrier of the planetary gear reducer. And, finally, the method includes driving, with chains, the wheel shafts of the vehicle.

It is an object of the present invention to save motor space in a utility vehicle, recreational vehicle, and the like while providing for high torque at the vehicle wheel and tire.

It is an object of the present invention to provide a planetary gear reducer in a utility vehicle, recreational vehicle and the like which enables use of a smaller, lighter, high speed motor while providing for high torque at the vehicle wheel and tire.

It is an object of the present invention to provide a planetary gear reducer in a utility vehicle, recreational vehicle and the like which enables use of a smaller, lighter high speed motor selected from the group of alternating current motors, direct current motors, hydraulic motors, and pneumatic motors.

It is an object of the present invention to provide a planetary gear reducer in a utility vehicle, recreational vehicle and the like which enables use of a smaller, lighter, high speed alternating current electric motor while providing for high torque at the vehicle wheel and tire.

It is an object of the present invention to provide for an efficient planetary gear reducer for use in a utility vehicle, recreational vehicle and the like.

It is an object of the present invention to provide for two offset electric motors in a utility vehicle, recreational vehicle, and the like by utilizing two offset planetary gear reducers.

It is an object of the present invention to utilize high speed alternating current motors in a utility vehicle, recreational vehicle or the like.

It is an object of the present invention to provide a method of using two high speed electric motors.

It is an object of the present invention to provide offset planetary gear reducers for use in combination with high speed motors for efficient use of space in a utility vehicle.

It is an object of the present invention to provide offset planetary gear reducers for use in combination with alternating current electric motors for efficient production of torque at the wheels of a utility vehicle.

It is an object of the present invention to provide right-angle planetary gear reducers in combination with high speed motors for efficient use of space in a utility vehicle.

It is an object of the present invention to provide right-angle planetary gear reducers for use in combination with alternating current electric motors for efficient production of torque at the wheels of a utility vehicle.

It is an object of the present invention to provide right-angle planetary gear reducers which employ an oil slinger for lubricating bearings which support a pinion gear shaft. The pinion gear shaft includes a recess and passageways therethrough communicating with a first chamber for supply of oil to the bearings. A second chamber returns oil through the pinion housing adapted for return of oil to the reservoir within the main housing.

It is an object of the present invention to provide a right angle gear reducer having first and second chambers for the lubrication of the pinion shaft bearings.

It is an object of the present invention to provide a utility vehicle with compact right angle gear reducers with motors oriented lengthwise enabling close spacing of vehicle side rails.

These and other objects of the invention will best be understood when reference is made to the Brief Description of the Drawings, Description of the Invention and Claims which follow hereinbelow.

BRIEF DESCRIPTION OF THE DRAWINGS

FIG. 2D is a perspective view of the carrier and the output shaft.

FIG. 3 is a block diagram of the method for using high speed alternating current electric motors with offset planetary gear reducers.

FIG. 5 is a process flow chart for lubricating bearings supporting a pinion shaft in a pinion shaft housing.

FIG. 6 is a process flow chart for using high speed motors in a utility vehicle with right angle planetary gear reducers.

The drawings will be best understood when reference is made to the Description of the Invention and Claims below.

DESCRIPTION OF THE INVENTION

Figure 1:
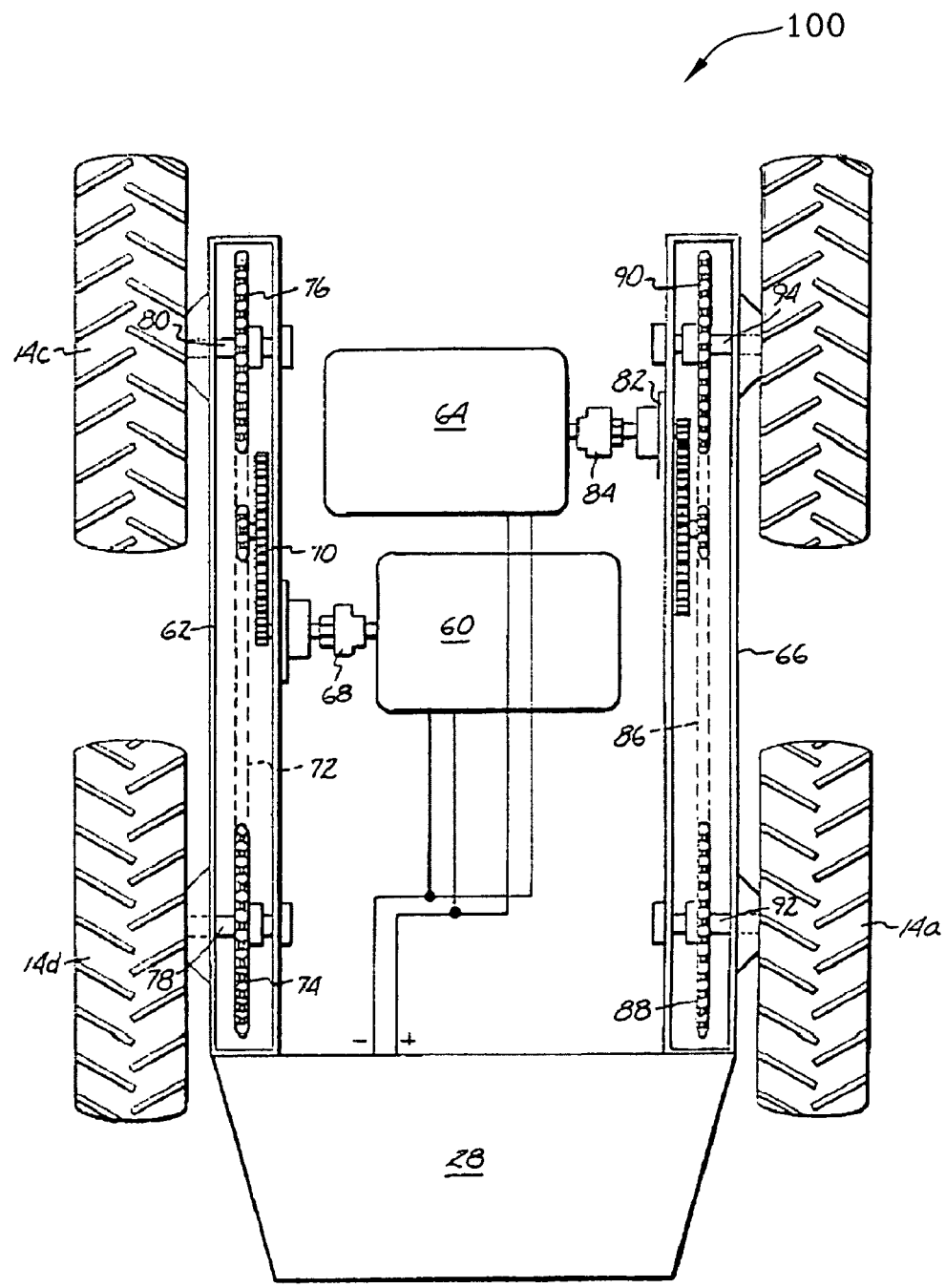
FIG. 1 is a plan view of a prior art Skid-Steer vehicle powered by two DC traction motors.
Figure 2:
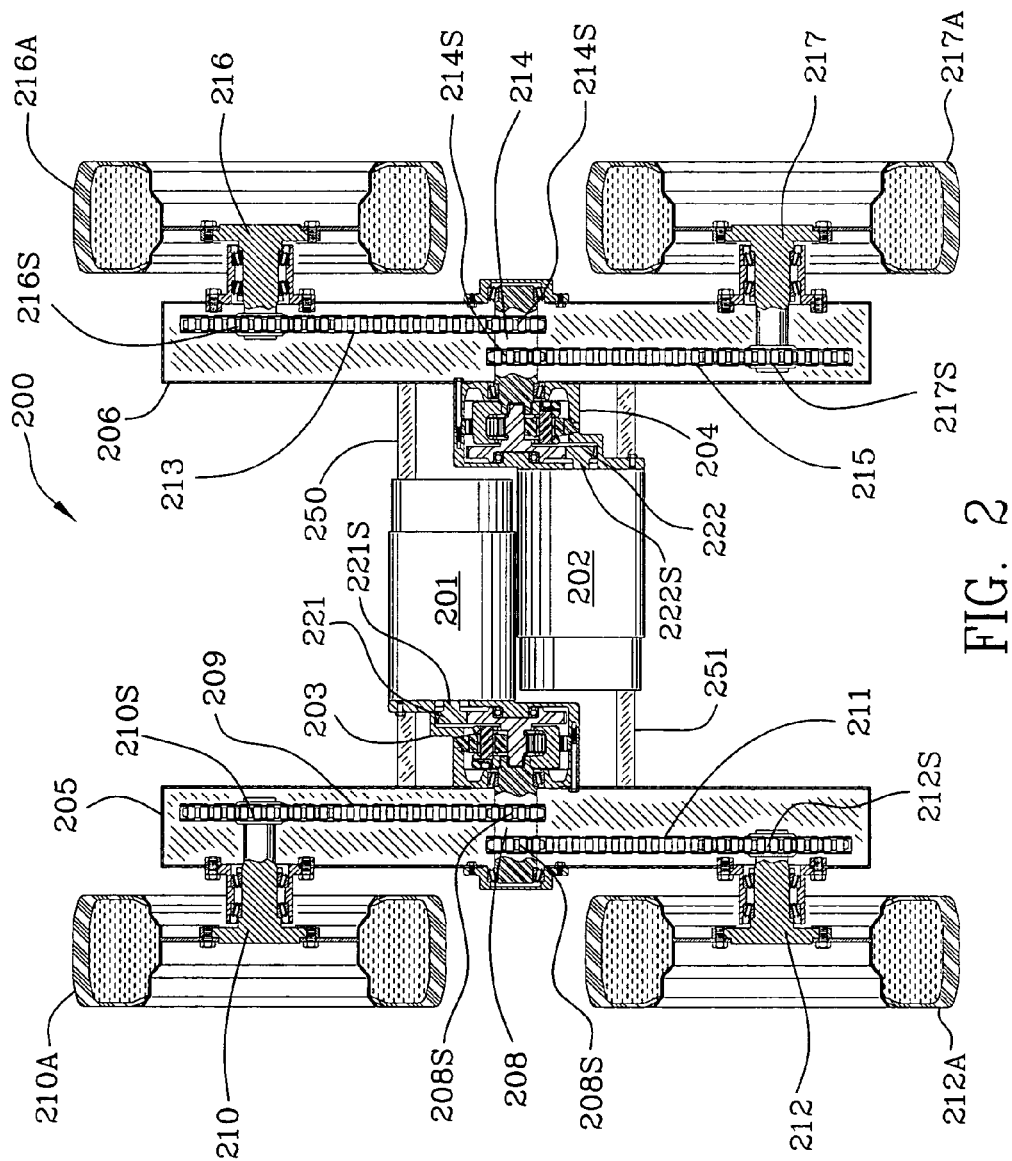
FIG. 2 is a top plan view of the utility vehicle illustrating two alternating current motors oriented side by side with each having an offset planetary gear reducer driving a respective output shaft.

FIG. 2 is a top plan view 200 of the utility vehicle illustrating two alternating current electric motors 201, 202 oriented side by side with each having an offset planetary gear reducer 203, 204 driving a respective output shaft 208, 214. Although reference numerals 201, 202 refer to high speed alternating current electric motors, it is specifically contemplated that other high speed motor types may be used such as direct current motors, hydraulic motors and pneumatic motors.

The utility vehicle includes a frame 205, 206, 250, 251 for supporting vehicle components. As illustrated in FIG. 2, side frame member 205 is on the left hand side of the vehicle and side frame member 206 is on the right hand side of the utility vehicle. The two side frame members 205, 206 are shown in section in FIG. 2, FIG. 2A, and FIG. 2B.

Frame side member 205 supports first chain driven wheel shaft 210. Sprocket 210S is formed as part of the wheel shaft 210 or alternatively is a separate sprocket affixed or attached to the wheel shaft 210. Frame side member 205 also supports the output shaft 208 of the planetary gear reducer 203.

Output shaft 208 includes two sprockets 208S which are identical. The sprockets 208S may be an integral part of shaft 208 or they may be separately attached to the shaft. A metal chain 210 interengages sprockets 210S and 208S and communicates horsepower and torque therebetween. The reduction ratio of output shaft driving sprocket 208S to driven sprocket 210S is approximately 2.5-5:1 such that for every rotation of the output shaft 208 the forward sprocket 210S and wheel shaft 210 turns 0.4 to 0.2 of a turn or revolution. Reduction in speed of the driven sprocket 210S results in a corresponding increase in torque for a given applied power.

Figure 2A:
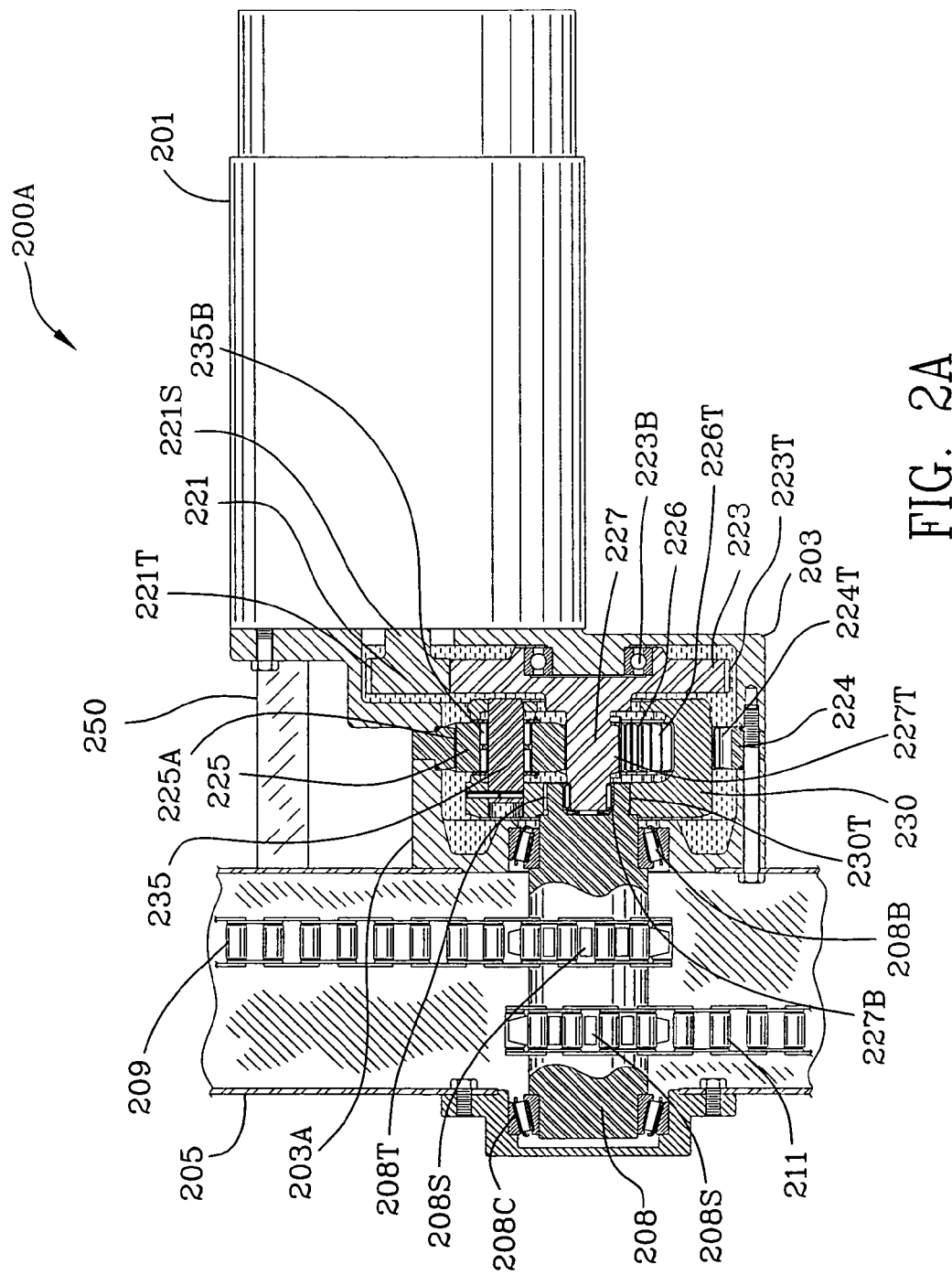
FIG. 2A is an enlarged portion of FIG. 2 illustrating a portion of the left side of the vehicle.
Figure 2B:
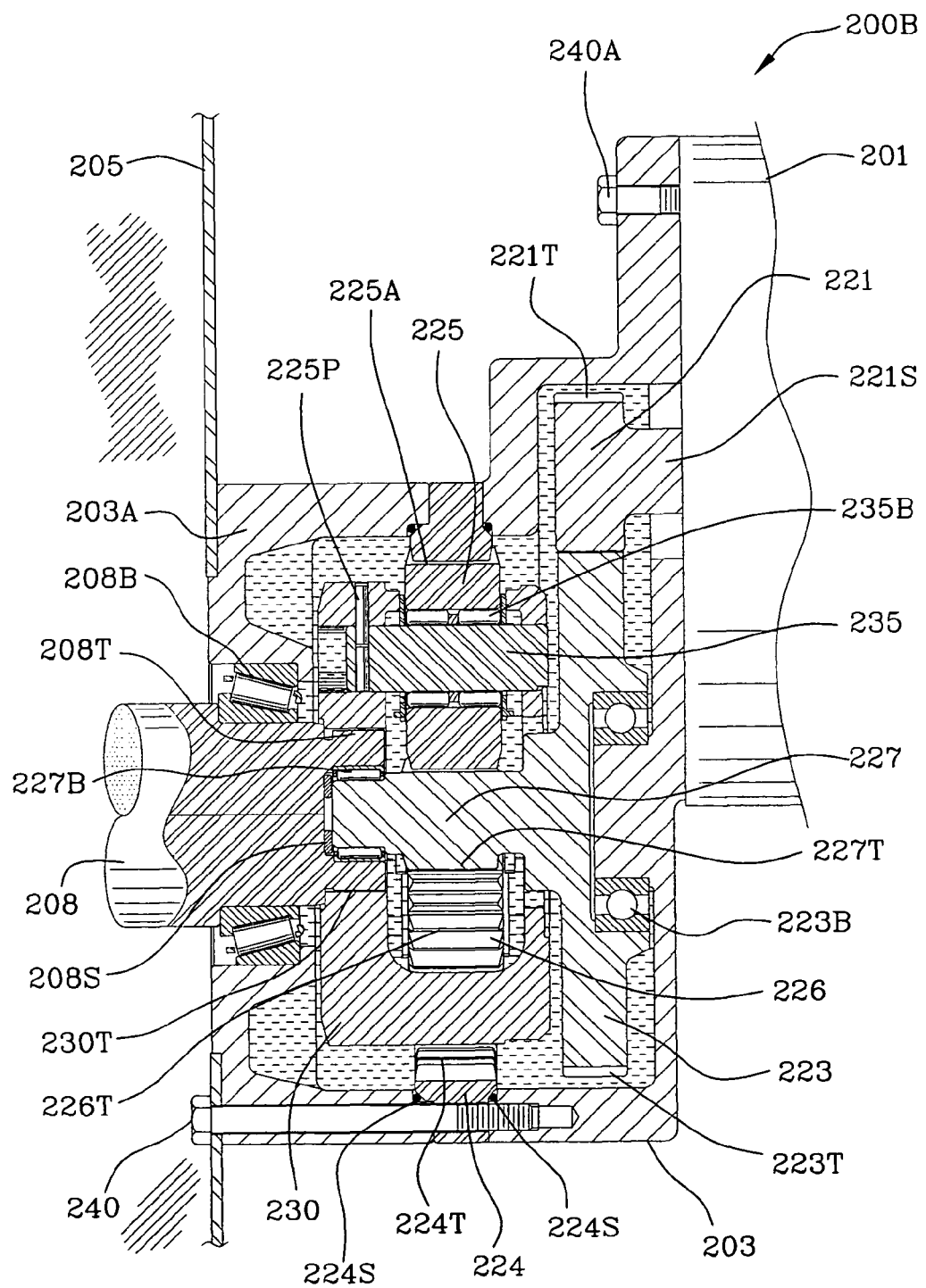
FIG. 2B is an enlarged portion of FIG. 2A illustrating the gear reducer and output shaft.

Referring to FIGS. 2 and 2B, output shaft 208 is splined and is coupled to the splined output 230T of the carrier 230 of the planetary gear reducer 203. Frame side member 205 also supports the second chain driven wheel shaft 212. Sprocket 212S is formed as part of the wheel shaft 212 or alternatively is a separate sprocket affixed or attached to the wheel shaft 212 for driving a rearward wheel 212A.

Metal chain 211 interengages sprockets 212S and 208S and communicates horsepower and torque therebetween. The reduction ratio of the output shaft driving sprocket 208S to driven sprocket 212S is approximately 2.5-5:1 such that for every rotation of the output shaft 208 the rearward sprocket 212S and wheel shaft 212 rotates just 0.4 to 0.2 of a turn or revolution. The reduction in speed of the driven sprocket 212S results in a corresponding increase in torque for a given applied power.

Similarly, the structure and operation of driven sprockets 216S, 217S, shafts 216, 217, frontward and rearward wheels 216A, 217A, sprockets 214S, shaft 214 and chains 213, 215 on the right side and within the right frame 206 are identical to the left frame side member 205 and frame 205. The reduction ratio of the output shaft driving sprocket 214S to driven sprockets 216S, 217S is the same as in connection with the left side of the vehicle, namely, approximately 2.5-5:1.

Speed reduction of approximately 2.5-5:1 just described are in addition to the speed reduction of the planetary gear reducers 203, 204 which are described further herein. Alternating current motors 201, 202 reside side by side and have output shafts 221S, 222S with pinion gears 221, 222 thereon for driving two offset planetary gear reducers 203, 204 to effect speed reduction and increase torque. Alternatively, a helical pinion gear 221H and a helical driven gear 223H.

Full load electric motor torque is generally defined as follows:

Torque(ft-lbs)=5250×horsepower/RPM

Generally, for a given power, high speed electric motors are smaller in size, lighter in weight, and less expensive than low speed motors. Generally, for a given power, alternating current motors are smaller than direct current motors. Additionally, for a given power, alternating current motors are smaller than direct current motors.

Use of planetary gear reducers 203, 204 with alternating current motors 201, 202 saves space. As previously stated the motors may be hydraulic, pneumatic or direct current motors.

Reducers 203, 204 are approximately 8 inches in diameter and approximately 5.5 inches deep and occupy a volume of approximately 300 cubic inches.

FIG. 2A is an enlarged portion 200A of FIG. 2 illustrating a portion of the left side of the vehicle and FIG. 2B is a further enlargement of a portion 200B of FIG. 2A illustrating the gear reducer 203 and pinion 221 on output shaft 221S in more detail.

Referring to FIGS. 2A and 2B, the alternating current motors 201, 202 are controlled by a variable frequency drive (not shown) to control the speed of the motors. Preferably the alternating current motors are three phase motors. Each of the offset planetary gear reducers 203, 204 include a housing having a ring gear 224 affixed thereto. Ring gear 224 is trapped between housing portions 203, 203A of the reducer. Seals 224S prevent leakage of lubricant from within the gear casing.

Each of the planetary gear reducers 203, 204 includes a carrier 230 having planetary gears 225, 226, 229 intermeshing with the ring gear 224 and an output spline 230T. Although the planetary gear reducer illustrated has three planetary gears, any reasonable number of planetary gears may be used. Each of the planetary gear reducers includes a gear 223 having teeth 223T driven by the pinion gear 221 of the output shaft 221 of the alternating current motor 201. The gear 223 driven by the pinion gear 221 of the output shaft 221S of the alternating current motor 201 includes a shaft portion forming a sun pinion 227 with gear teeth 227T.

Sun pinion or gear 227 intermeshes with three planet gears 225, 226, and 229 each of which naturally include teeth 225T, 226T and 229T which intermesh with ring gear 224. Ring gear 224 extends around the inner circumference of the gearbox. Each of the chain drive shafts 208, 214 includes a spline 208T thereon which intermeshes with output spline 230T of the carrier 230 as best viewed in FIG. 2B. Planetary gear reducers 203, 204 effect a speed reduction in the approximate range of between 20-30:1. That is for every revolution of the input pinion gears 221, 222, the carrier 230 will rotate 1/20 to 1/30 of a revolution. Other speed reductions are specifically contemplated. Chain drive sprockets 208S, 214S in combination with wheel shaft sprockets 210S, 212S, 216S and 217S effect a speed reduction in the approximate range of 2.5-5:1. That is, for every one rotation of the chain drive sprocket 208S, the wheel sprockets 210S, 212S will rotate 0.4 to 0.2 of a revolution. Other speed reductions are specifically contemplated. Since torque is inversely proportional to the shaft rotational speed, torque is increased with a reduction in speed.

Other speed reductions are specifically contemplated depending on the desired torque at the wheels and traveling speed of the machine taking loads, inclines and other variables into consideration. Use of the offset speed reducer as disclosed herein enables the efficient use of space and provides the same torque to the wheel with less input torque supplied by the high speed electric motor. The efficiency of the offset speed reducer is approximately 95% at rated load.

Use of the offset speed reducer and electric motors enables use of high speed, light weight electric motors which are smaller in diameter and output less torque than slower, heavier larger motors whether they are alternating current motors or direct current motors. The savings in space, weight and money attained by use of the offset planetary gear reducers with high speed motors is considerable. Use of planetary gear reducers provides a stable transmission of power with torque amplification inversely proportional to the speed reduction. The planetary gear reducers of the instant invention weigh approximately 100 pounds but can vary in weight depending on the materials used such as steel, stainless steel or aluminum. The gears 223, 225, 226, 229 and the carrier 230 are made of steel or stainless steel. Aluminum may be used for the gearbox casing 203, 203A if extremely light weight is desired. The low weight of the gear reducer having a volume of about 300 cubic inches (approx. 8 inches in diameter and 5.5 inches deep) in combination with a light-weight alternating current motor provides a compact low cost arrangement when placed side by side as illustrated in FIG. 2.

Alternating current electric motors 203, 204 are water cooled motors and run at 7,000 to 8,000 RPM. At approximately 7500 RPM the three phase electric motor outputs approximately 14.75 ft-lbs. of torque which equates to approximately 21 horsepower. The peak starting torque is about 77 ft-lbs. The motors to be used are about 14 inches long and 8 inches in diameter and have a volume of approximately 700 cubic inches.

Figure 2C:
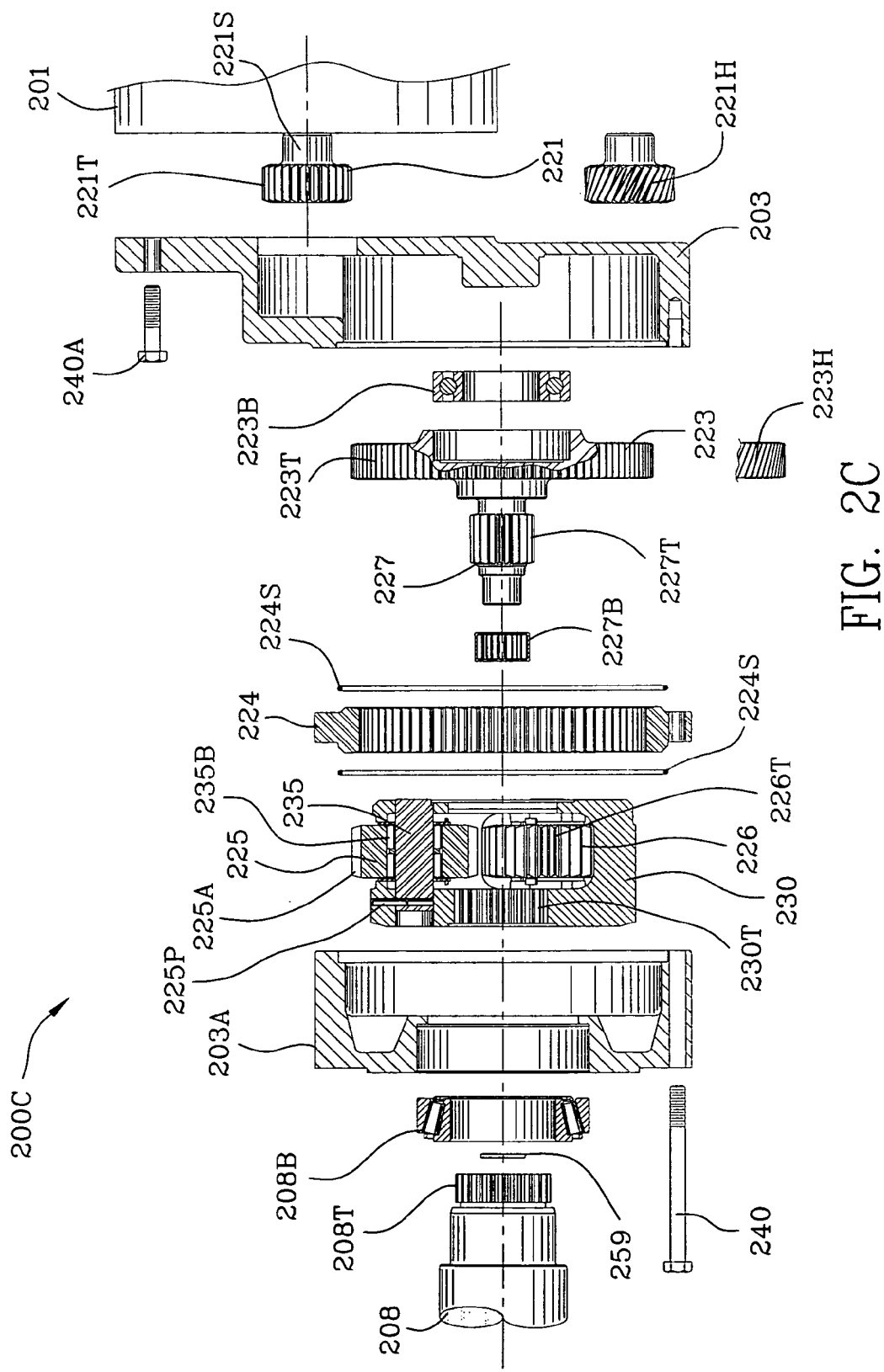
FIG. 2C is an exploded view of the input to the gear reducer, the gear reducer, and the output shaft.

FIG. 2C is an exploded view 200C of the input to the gear reducer 221T, the gear reducer 203, and the output shaft 208. Referring to FIGS. 2B and 2C, sun pinion 227 is supported by bearing 223B and 227B. Use of gear 223 enables the planetary gear reducer to be offset as it is driven by pinion 221 which is on the shaft 221S of the electric motor. Three planet gears 225, 226 and 229 and, more specifically, their teeth 225T, 226T and 229T intermesh with sun pinion teeth 227T and ring gear 234 and its teeth 234T.

Planet gears 225, 226 and 229 are supported by bearings (i.e., 235B) and are pinned to the carrier by pins. See, for example, pin 235 in FIGS. 2A and 2B. Pin 225 P restrains pin 235 from movement within the carrier 230 and thus secures gear 225 in place. Gear 225 and the other planet gears are, of course, free to rotate but they are securely fastened to the carrier and impart rotational motion to the carrier 230. Reference numeral 225A indicates intermeshing between planet gear teeth 225T and ring gear teeth 224T. Referring to FIG. 2A, output shaft 208 is supported by bearings 208B and 208C and intermeshes its spline 208T with spline 230T of the carrier.

Planetary gear reducer 203 distributes the load evenly to three planets, 225, 226 and 229. As previously indicated any reasonable number of planet gears from 1 to "n" may be used. Reciting the operation of the gear reducer, torque is applied by shaft 221S through teeth 221T of pinion 221 which imparts rotational movement and torque to gear 223. Gear 223 includes sun pinion 227 which by and through its teeth 227T imparts rotational movement and torque to gears 225, 226 and 229 via teeth 225T, 226T and 229T. As previously stated planet gears 225, 226 and 229 are free to rotate and impart rotational movement to carrier 230 effecting a speed reduction which is transmitted to output shaft 208 which is interconnected with the carrier spline 230T. The gearbox 203, 203A is separable into two portions 203 and 203A and they trap ring gear 224 when the gearbox is secured by fastener 240A to the electric motor 201 and when the portions 203, 203A are secured together by fastener 240.

Figure 2E:
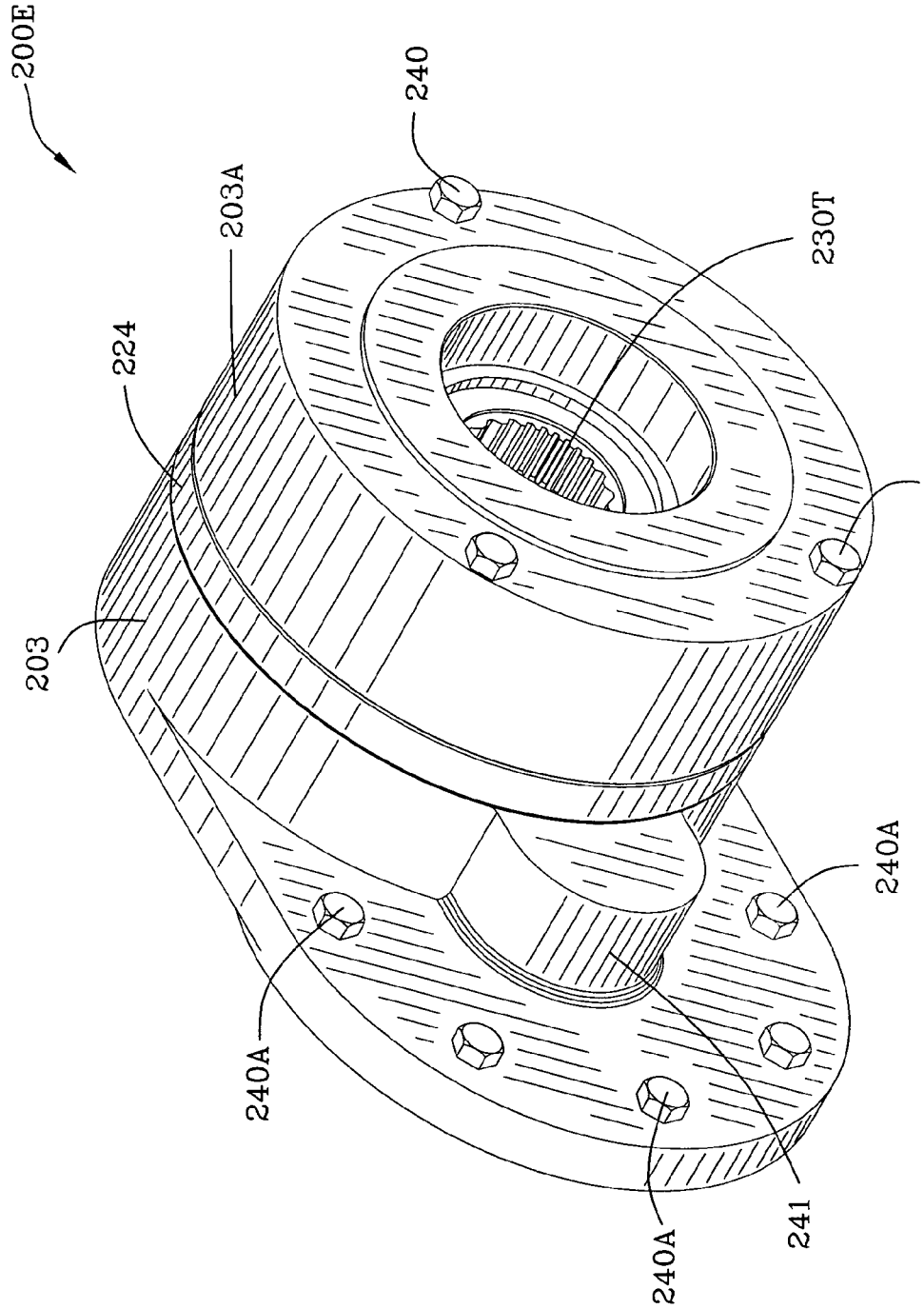
FIG. 2E is a perspective view of the offset planetary gear speed reducer.

FIG. 2D is a perspective view 200D of the carrier 203, 203A, planet gears 229 and 225, and output shaft 208 with a corresponding spline 208T. FIG. 2E is a perspective view 200E of the offset planetary gear reducer without bearing 208B illustrated therein. The principal dimensions of the offset planetary gear reducer are approximately 8 inches in diameter and 5.5 inches deep neglecting the input housing 241 which houses pinion 221. The offset planetary gear reducer is generally cylindrically shaped and includes a housing 241 for the shaft driven pinion gear 221. A flange (unnumbered) is fastened to the motor 201.

FIG. 3 is a block diagram 300 illustrating a method for using high-speed electric motors in combination with offset planetary gear reducers in a utility vehicle. The first step includes orienting two high speed electric motors having shaft driven pinion gears side by side 301 such that their shaft driven pinion gears are arranged on opposite sides of the vehicle. Next, the method includes mounting offset planetary gear reducers in engagement with the shaft driven pinion gears 302. Each of the planetary gear reducers 203, 204 include a gear driven by the shaft driven pinion gears 221, 222. The gear driven by the shaft driven pinion gears includes a shaft portion formed as a sun pinion gear 227 which drives a planetary gear set and carrier 230 reacting against a ring gear 224 in the casing of the planetary gear reducer 203, 203A. The carrier 230 of the planetary gear reducer includes a splined output 230T and each of the splined outputs 230T are on the same axis. The method further includes driving an output shaft 208, 214 coupled to the splined output 230T of the planetary gear reducer. Finally, the method includes driving, with chains (209, 211, 213, 215), the wheel shafts (210, 212, 216, 217) of the vehicle.

Figure 4:
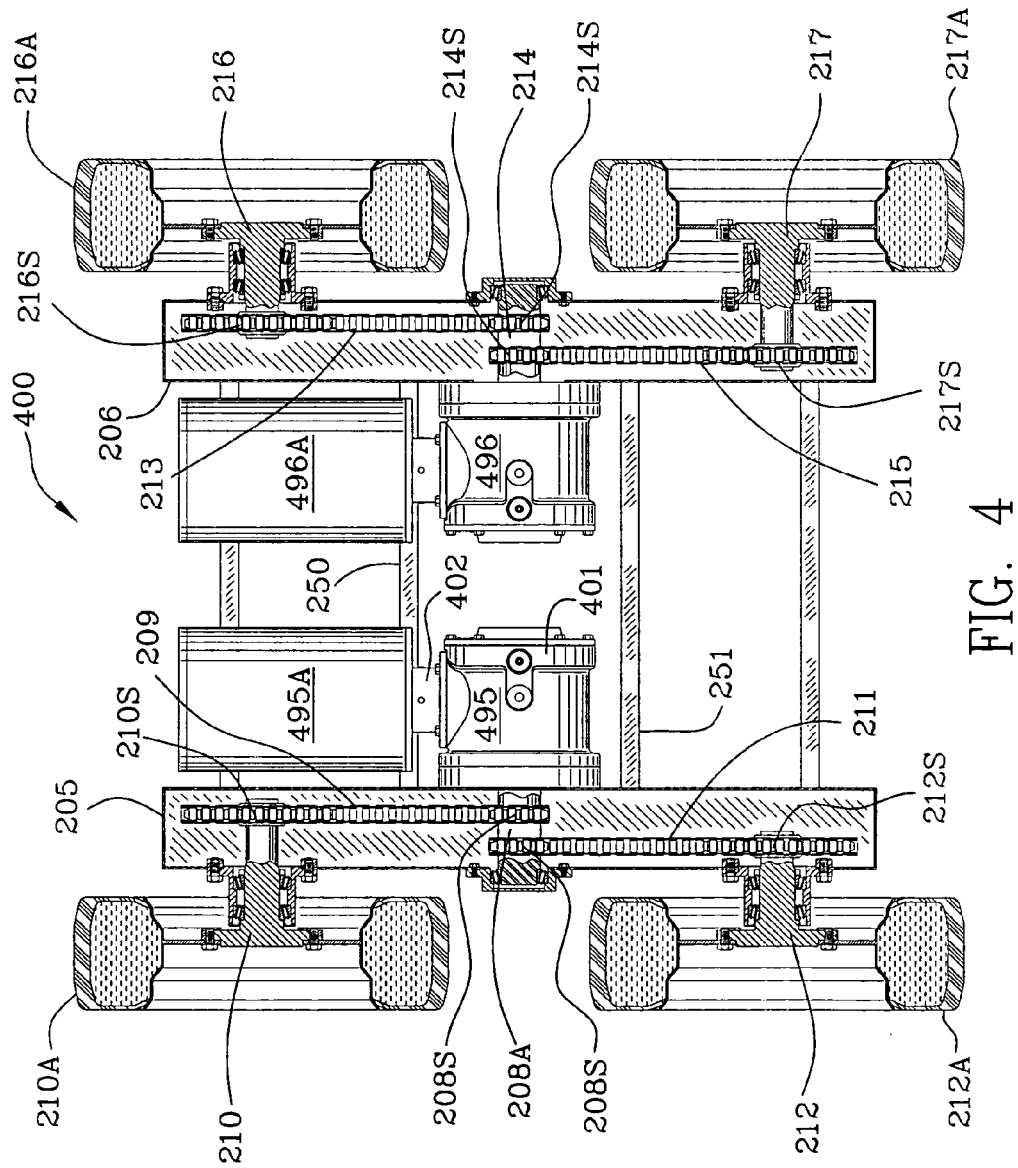
FIG. 4 is a top plan view of the utility vehicle illustrating two alternating current motors in conjunction with two right-angle drives.

FIG. 4 is a top plan view 400 of the utility vehicle illustrating two alternating current motors 495A, 496A in conjunction with two right-angle drives 495, 496. Each of the right angle drives includes a main housing 401 and a pinion housing 402. Frame supports 250, 251 support motors 495A, 496A. Main housing 401 and gear housing 403 are preferably made of 8620H annealed steel. See FIG. 4A. Main housing 401 is approximately 10" in diameter and 8" long. Pinion housing 402 is approximately 3" long and 4" in diameter. Motors 495A, 496A are preferably electric motors but may be hydraulic or pneumatic motors.

Figure 4A:
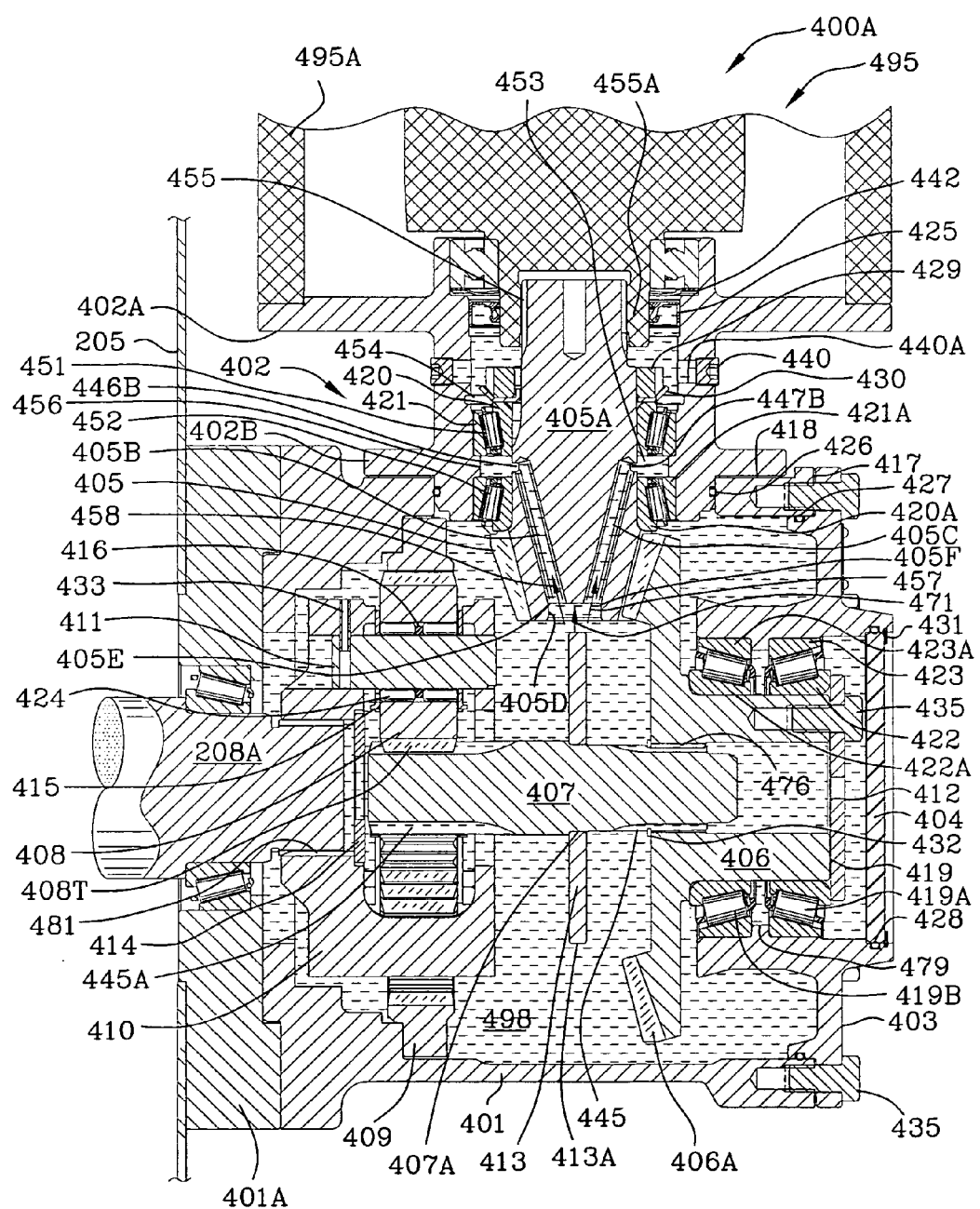
FIG. 4A is a cross-sectional view of one of the right-angle drives and motor.
Figure 4B:
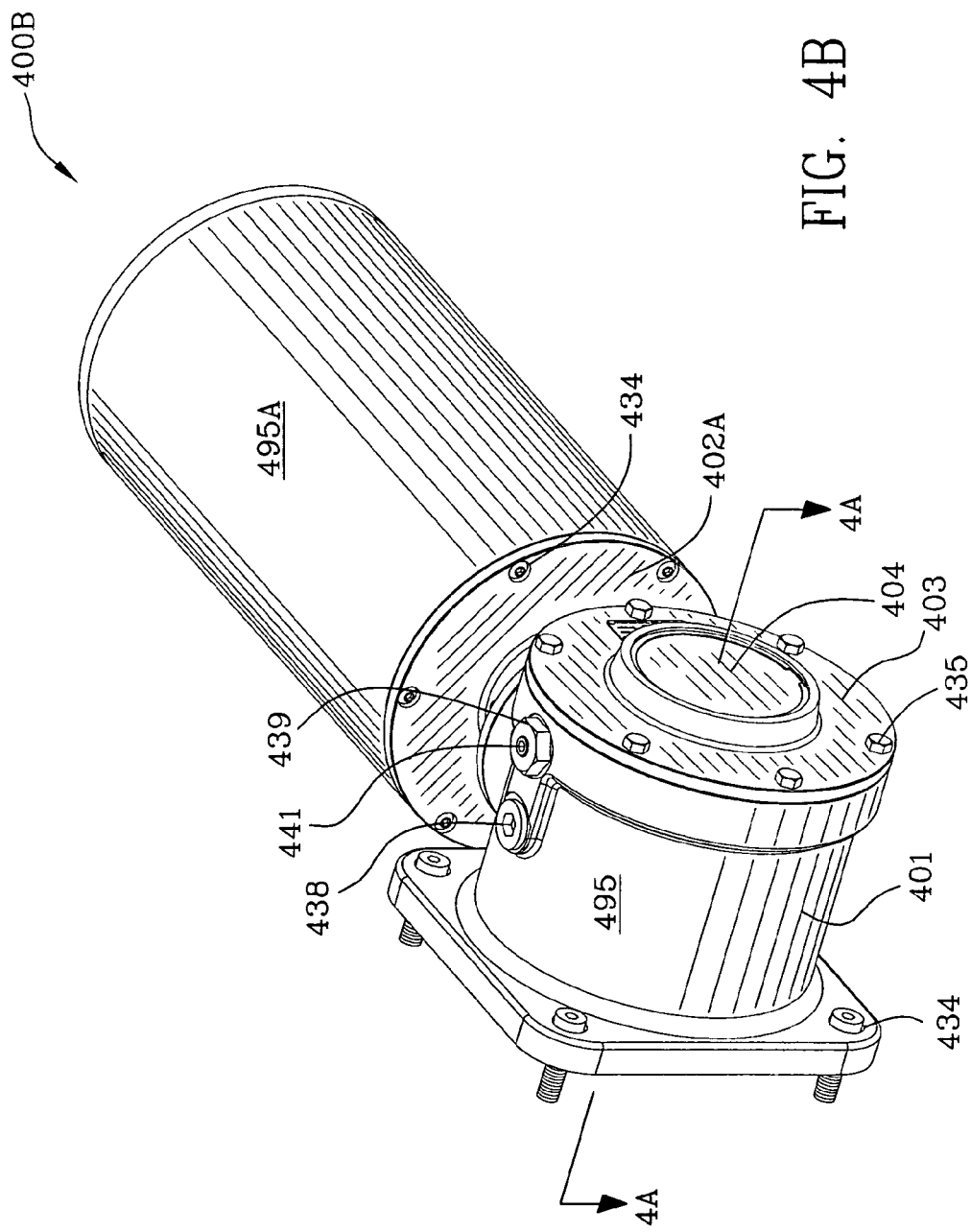
FIG. 4B is a perspective view of one of the right-angle drives.

FIG. 4A is a cross-sectional view 400A of one of the right-angle drives 495 and motor 495A taken along the lines 4A-4A of FIG. 4B. A portion of the main housing defines a fluid reservoir which holds oil 498 at a level as indicated by reference numeral 499. See FIG. 4L. Oil 498 is illustrated in the reservoir formed by the main housing 401 and the spacer 401A and it is used to lubricate the intermeshing spiral bevel pinion gear and the spiral bevel gear as well as the planetary output gear set. Additionally, oil 498 is used to lubricate all bearings in the pinion housing and the main housing. Pinion housing 402 includes a flange 402A for connection to the motor 495A. Pinion housing 402 further includes a flange 402B for connection with gear box 401. Spacer 401A is used to interconnect the main housing 401 of the right angle drive 495 to the vehicle sidewall 205.

FIG. 4B is a perspective view 400B of one of the right-angle drives 495 and motor 495A. Referring to FIGS. 4A and 4B, flange 402A secures the pinion housing to the motor 495A. Gear housing 403 is secured to main housing 401 with threaded bolts 435. Gear housing 403 includes a polycarbonate cap 404 secured therein by a snap ring 431 and sealed with an O-ring 428. The main housing is attached to the spacer 401A and the support 205 using bolts not shown.

Spiral bevel pinion, sometimes referred to herein as the spiral bevel pinion, gear 405 and spiral bevel gear 406 are preferably made of 8620H annealed steel.

Still referring to FIG. 4B, motor mounting bolts 434 secure the motor 495A to the flange 402A of the pinion housing. Inspection plugs 438, 439 and 439 are illustrated in FIG. 2B and enable quick and easy inspection of the main housing and/or enable the addition of oil.

Referring to FIG. 4A, bearings 419A, 419B support the spiral bevel gear 406 which is driven by the spiral pinion gear 405. Bearings 419A, 419B are supported by cones 422, 422A and cups 423, 423A. Spiral bevel gear bearing retention plate 412 traps and secures bearing 419A against stop 479. Preferably the retention plate is made of mild steel. Retention bolt 435 secures spiral gear bearing retention plate 412 to the spiral bevel gear 406. A shim 419 is used between the bearing retention plate 412 and the gear body 406. Spiral gear housing 403 is sealed with respect to main housing 401 with O-ring seals 427. Pinion housing 402 is preferably made of mild steel as is gear housing 403. Gear housing 403 is secured to the pinion housing 402 using a pinion housing shim pack 418 and a gear housing shim pack 417. Pinion housing seal 426 seals the gear housing 403 and the main housing 401 to the pinion housing 402.

Still referring to FIG. 4A, spiral pinion gear teeth 405 intermesh with spiral bevel gear teeth 406A of the spiral gear 406. Spiral bevel gear 406 includes a spline 476 which intermeshes with a reciprocal spline 445 in the sun gear shaft 407 to drive the oil slinger 413 and the sun gear 445A. Sun gear shaft retaining ring 432 positions sun gear shaft 407 and prevents rightward travel of the shaft 407 when viewing FIG. 4A. Thrust plate 414 prevents shaft 407 from travel in the leftward direction when viewing FIG. 4A.

Still referring to FIG. 4A, the input to the gear box is the pinion shaft 405 and spiral bevel gear 405. Pinion shaft 405A drives gear 406 which in turn drives sun gear shaft 407 and sun gear 445A. The planetary sun gear inputs to the planetary stage. Planetary gear sets provide torque multiplication in compact packages. The output of the gear box 495 is a carrier 410 with a planetary gear-set reduction including a stationary ring gear 409. Carrier 410 is preferably made of D7003 grade steel. The main housing or casing 401 includes ring gear 409 which is a reaction gear and intermeshes with a three-gear planetary set comprising planet gears 408. Ring gear 409 is secured to the main housing 401 though bolts not viewed in FIG. 4A. The carrier 410 of the planetary gear set includes an internal spline 481 which intermeshes with a splined output shaft 208A which is the output to drive the vehicle. The right angle planetary gear reducers 495, 496 effect a speed reduction in the approximate range of between 20-30:1. That is for every revolution of the input pinion gear 405, the carrier 410 will rotate 1/20 to 1/30 of a revolution. Other speed reductions are specifically contemplated As discussed above in regard to FIGS. 2-2E, use of electric motors, hydraulic motors and/or pneumatic motors is specifically contemplated. The right angle planetary gear drive with the above stated speed reduction enables use of a utility vehicle having a relatively narrow width between side rails.

Still referring to FIG. 4A, planet gears 408 include gear teeth 408T driven by sun gear teeth 445A. Planet gears 408 are pinned to the carrier 410 using roll pins 433 mounted to planet pins 411 which provide support for the gears. Needle roller bearings 424, spacers 416 and thrust bearings 415 position and support the planet gears 408 for rotation about the planet pins 411.

Figure 4C:
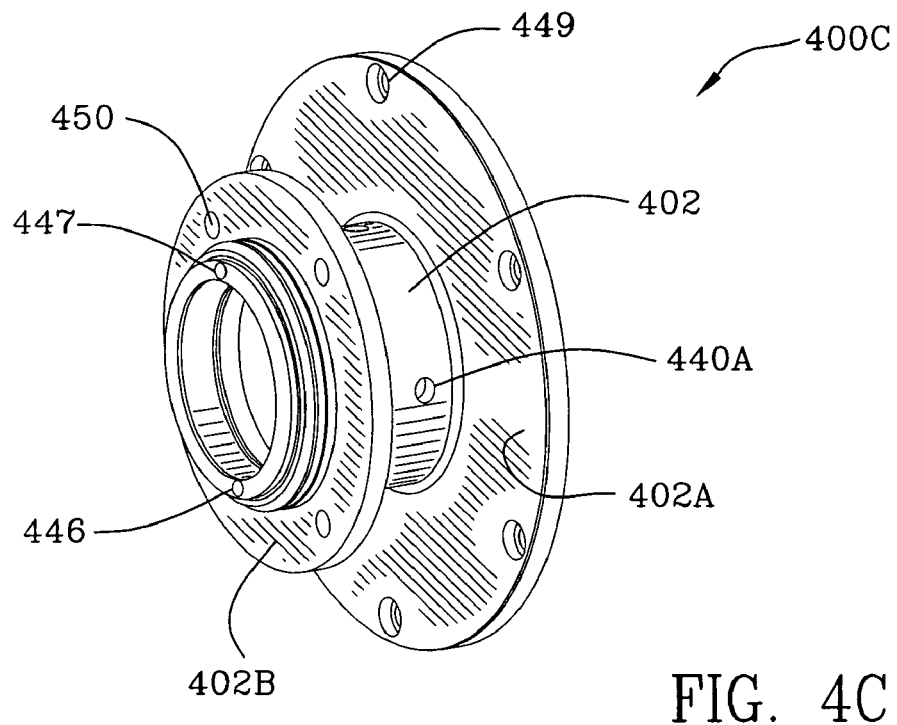
FIG. 4C is a perspective view of the pinion shaft housing.
Figure 4D:
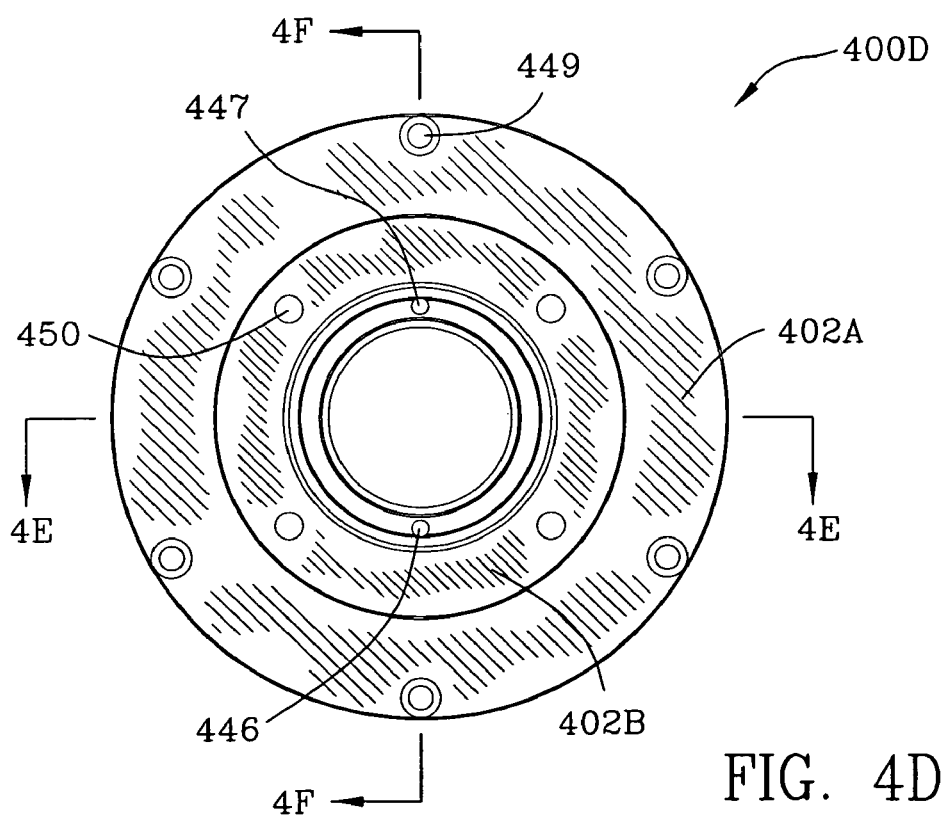
FIG. 4D is an end view of the pinion shaft housing.
Figure 4E:
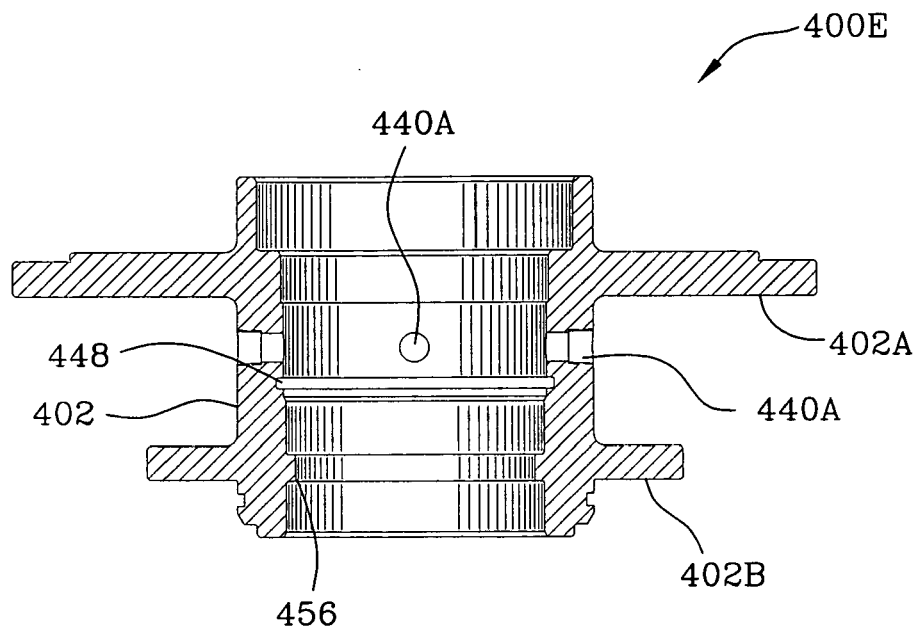
FIG. 4E is a cross-sectional view of the pinion shaft housing taken along the lines 4E-4E of FIG. 4D.
Figure 4F:
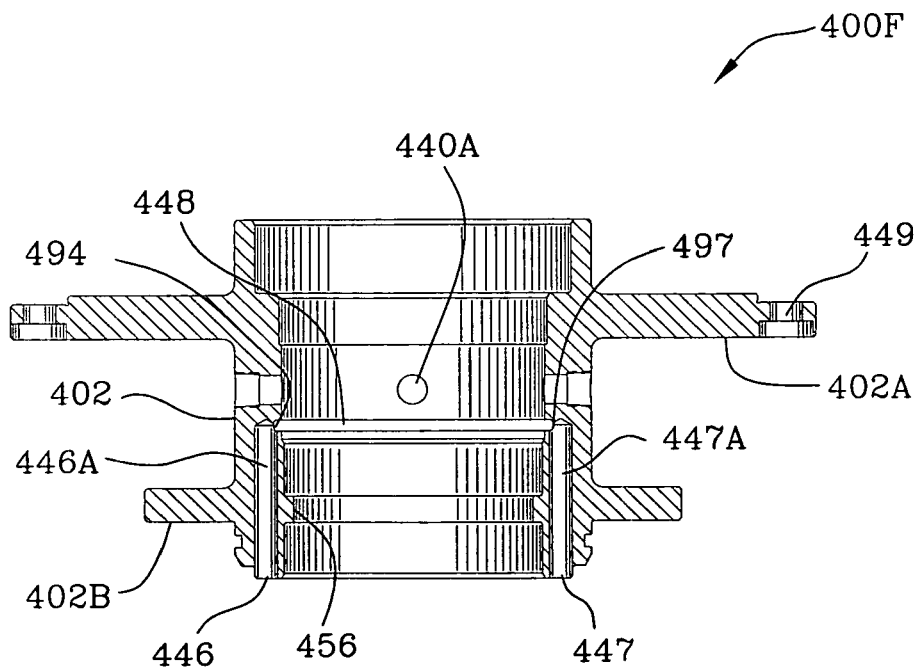
FIG. 4F is a cross-sectional view of the pinion shaft housing taken along the lines 4F-4F of FIG. 4D.
Figure 4G:
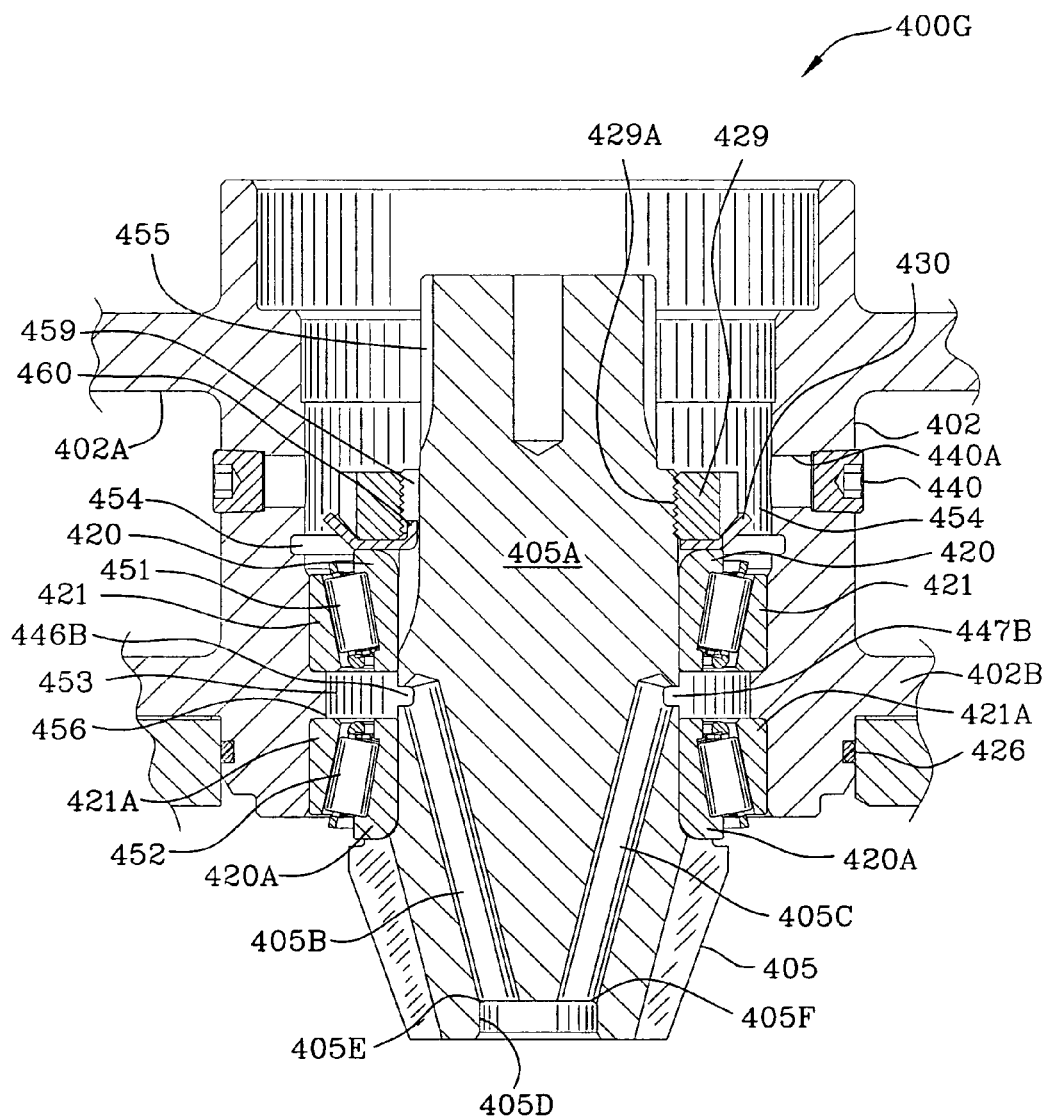
FIG. 4G is an enlargement of a portion of FIG. 4A.

FIG. 4G is an enlargement 400G of a portion of FIG. 4A. Pinion housing 402 is generally cylindrically shaped and carries pinion shaft 405A supported by roller bearings 451 and 452. Roller bearings 451 are supported by cup 421 and cone 420 and the roller bearings 452 are supported by cup 421A and cone 420A. Inner circumferential stop 456 in conjunction with locknut 429 and pinion tanged lockwasher 430 support and secure bearings 451 and 452 within the pinion housing. Tang 460 of lockwasher 430 interengages slot 459 in pinion shaft 405A and is compressed by locknut 429 threadingly interengaging 429A shaft 405A.

Still referring to FIGS. 4A and 4G, pinion shaft 405A includes grooves 455 which interengage motor coupling 455A for driving the pinion shaft. Pinion shaft rotates at approximately 6-7000 rpm. Heat dissipation from the bearings is addressed by supplying oil to chamber 453 formed between roller bearings 451, 452, pinion shaft 405A and the interior of the pinion housing 402. Chamber 453 is fed by ports 446B, 447B in the pinion shaft 405A. Ports 446B, 447B are supplied by passageways 405B, 405C. Passageways 405B, 405C are fed by ports 405E, 405F which are located in cylindrical recess 405D. Ports 405E and 405F are located diametrically opposite each other in cylindrical recess 405D. See, FIG. 4L, a cross-sectional view 400L of the gear casing. Cylindrical recess 405D receives oil from oil slinger 413 as viewed in FIG. 4A as pinion shaft 405A rotates.

Figure 4H:
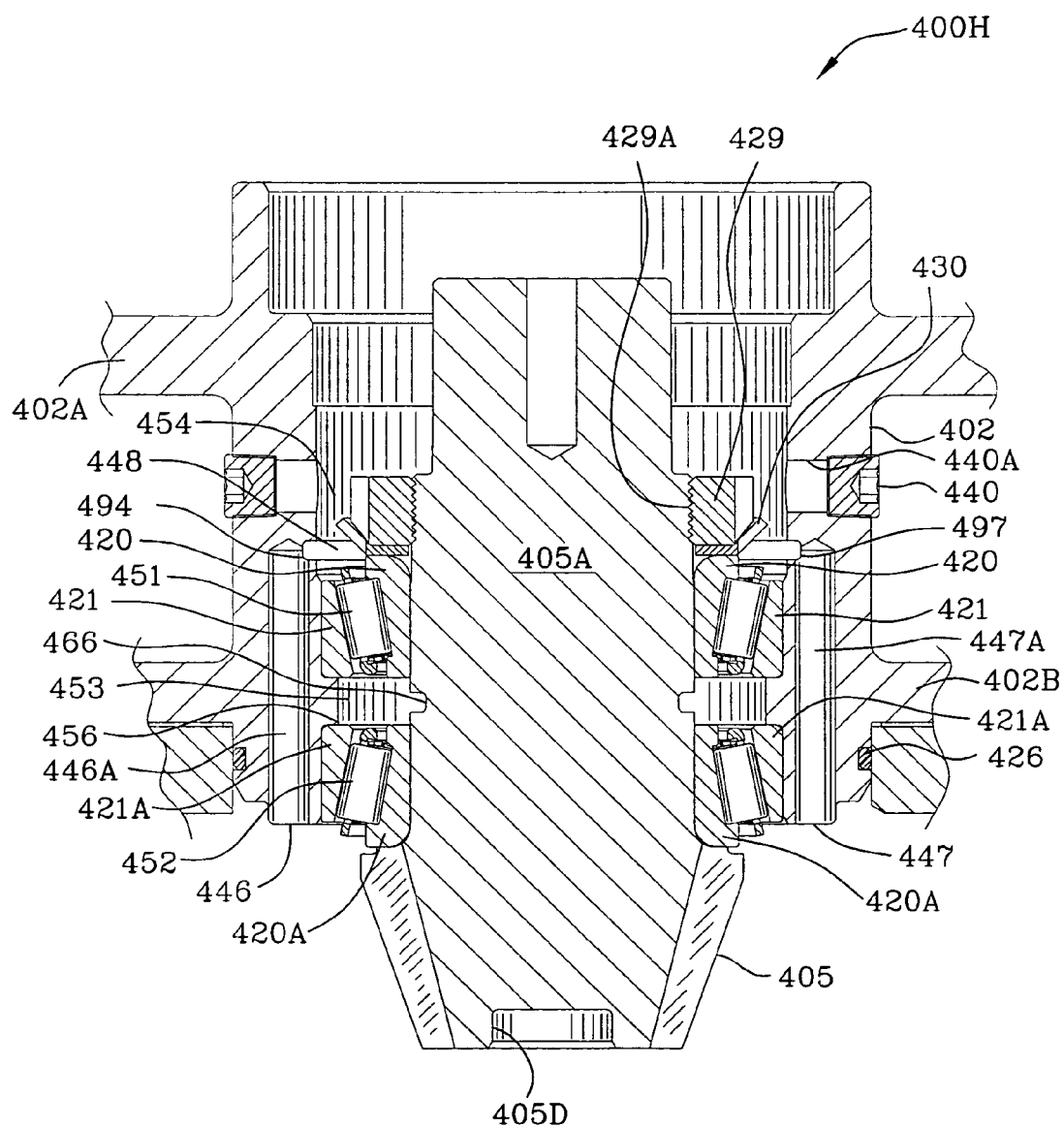
FIG. 4H is an enlarged view similar to FIG. 4F with the pinion shaft and bearings inserted therein.

Oil slinger 413 is coupled to shaft 407 by a press fit or threaded interconnection 407A and rotates therewith. Gear 406 includes spiral bevel teeth 406A interengaging teeth 405 of spiral bevel pinion 405A. Oil slinger 413 is approximately 4.5 inches in diameter. FIG. 4L is a cross-sectional view 400L of the gear casing indicating shaft 407 in phantom driving oil slinger 413 which picks up oil 499 from the reservoir within the main housing 401 and deposits it into the rotating recess 405D. FIG. 4A illustrates oil flow as indicated by flow arrow 471 from the oil slinger 413.

Referring to FIGS. 4A, 4G and 4L, as pinion shaft 405A rotates, oil in recess 405D is urged radially outwardly under centrifugal force and into ports 405E and 405F. As oil flows into ports 405E and 405F it is urged into and through radially and longitudinally extending passageways 405B and 405C under centrifugal force as indicated by flow arrows 457, 458. Passageways 405B and 405C terminate, respectively, in ports 446B and 447B which communicate with chamber 453. Ports 446B and 447B are in groove 466 in the exterior of the pinion shaft 405A and communicate with and supply oil to chamber 453. See FIGS. 4G, 4I and 4J.

Still referring to FIGS. 4A and 4G, chamber 453 fills with oil after shaft 405A makes a sufficient number of revolutions (following startup) and supplies oil to tapered roller bearings 451 and 452 whereby oil is pumped outwardly through the bearings. Tapered roller bearings 452 pump oil to reservoir 499 and tapered roller bearings 451 pump oil to oil return chamber 454. Chamber 454 is bounded by pinion housing 402, lock washer 429, lock nut 429, pinion shaft 405A, motor coupling 455A and motor input seal 425. Preferably seal 425 is a Viton seal. Wave spring 442 resides between the motor and the motor input seal 425.

Chamber 454 communicates with ports 494, 497 in inner circumferential groove 448 which in turn communicate with passageways 446A and 447A. See FIG. 4H. Ports 446B and 447B are formed in inner circumferential groove 448 in the interior of the pinion housing 402. Pinion housing 402 is generally cylindrically shaped with flanges 402A, 402B for interconnection with the main housing 401 of the gear box and the motor 495A. Passageways 446A, 447B terminate, respectively, in ports 446, 447 which permit oil to be discharged into the main housing 401 which serves and forms the oil reservoir. Ports 446 and 447 are preferably arranged vertically such that port 446 is submerged below the oil level 499.

FIG. 4C is a perspective view 400C of the pinion shaft housing 402 illustrating motor flange 402A and main housing flange 402B. Ports 446 and 447 are illustrated in their vertical orientation. Other orientations of the ports 446 and 447 are specifically contemplated. Access ports 440A are illustrated in FIG. 4C as are flange bolt holes 449, 450. Referring to FIGS. 4A and 4H, access ports 440A are illustrated with plugs 440 threaded therein. FIG. 4D is an end view 400D of the pinion shaft housing illustrating the vertical orientation of ports 446, 447. Ordinarily port 446 will be submerged in oil. Other configurations with more or fewer oil return ports may be used.

FIG. 4H is an enlarged view 400H similar to FIG. 4F with the pinion shaft 405A and bearings 451, 452 inserted therein. Groove 466 is an outer circumferential groove in the pinion shaft 405A viewed in FIGS. 4H and 4I. Ports 446B and 447B are formed in the outer circumferential groove 466 as viewed in FIGS. 4G and 4H. Ports 494 and 497 are illustrated in FIG. 4H in communication with oil return chamber 454. Oil is pumped by tapered roller bearings 451 into oil return chamber 454 and groove 448 in the pinion shaft housing where it flows into passageways 446A and 447A to ports 446 and 447 respectively. Port 446 is actually submersed below the oil line 499 as illustrated in FIG. 4L. Bearings 451, 452 are submersed in oil when the motor 495A is started and pinion shaft 405A begins to rotate. The bearings are lubricated adequately by submersion in the oil because the pinion shaft (although rotating at approximately 6000 to 7000 rpm) has not yet generated too much heat for the bearings to withstand since they are already lubricated due to their partial submersion in the oil. Full lubrication occurs very quickly as the oil slinger 413 gathers oil from the reservoir and slings or throws it into recess 405D and thereafter through the pinion shaft 405A.

Similarly, bearings 419, 419A support sun gear shaft 407 and are adequately lubricated by oil in the reservoir. Sun gear shaft 407 rotates considerably slower than the input pinion shaft 405A thus generating less heat. Bearings 419, 419A sit partially submerged in oil when shaft 407 is not rotating.

Oil is slung from the outer circumference 413A of the oil slinger 413 as illustrated by flow arrow 471 in FIG. 4A. Some oil may be picked up from the sides of the oil slinger but the majority of oil 498 is picked up and slung from the outer circumference 413A of the oil slinger. The oil slinger 413 is disc shaped and the outer circumference is not contoured and roughened. However, it is specifically contemplated that various shapes and configurations of oil slingers may be used such that the surfaces of the oil slinger are contoured or roughened. The oil slinger disc 413 is preferably made of mild steel.

FIG. 4E is a cross-sectional view 400E of the pinion shaft housing 402 taken along the lines 4E-4E of FIG. 4D. Inner circumferential groove 448 is illustrated in FIG. 4E along with bearing stop 456. Bearing stop 456 and pinion shaft 405A secure tapered roller bearings 452 in place. Locknut 429 used with lockwasher 429A secures bearing 451 against bearing stop 456. See FIGS. 4G and 4H.

FIG. 4F is a cross-sectional view 400F of the pinion shaft housing taken along the lines 4F-4F of FIG. 4D and illustrates the oil return passageways 447A, 447 and 446A, 446 without the pinion shaft 405A inserted therein.

Figure 4I:
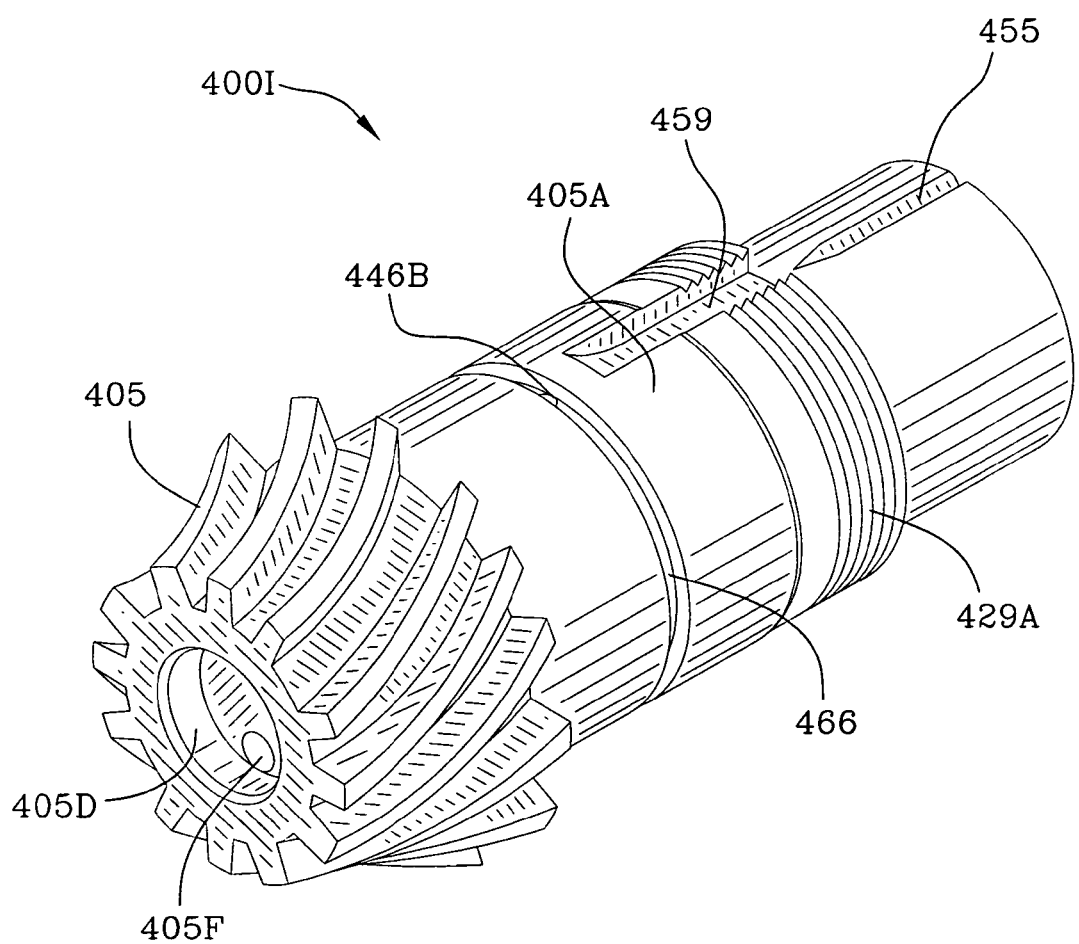
FIG. 4I is a perspective view of the pinion shaft and spiral bevel pinion.

FIG. 4I is a perspective view 400I of the pinion shaft 405A and gear 405. FIG. 4I provides a view of the outer circumferential groove 466 communicating with port 446B as well as slot 459 used in locking conjunction with tanged lockwasher 430. Recess 405D in the nose of the pinion gear and shaft reveals port 405F therein. Pinion shaft 405A illustrates exterior threads 429A for interconnection with locking nut 429 as illustrated in FIG. 4A for the purpose of trapping the bearings 451, 452.

Figure 4J:
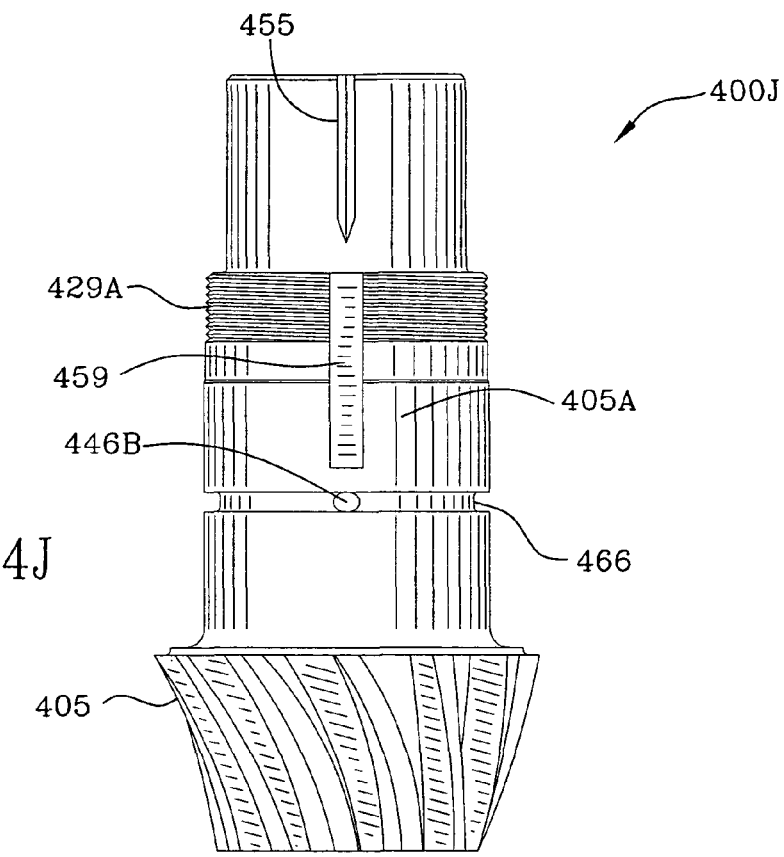
FIG. 4J is a top view of the pinion shaft and spiral bevel pinion.
Figure 4K:
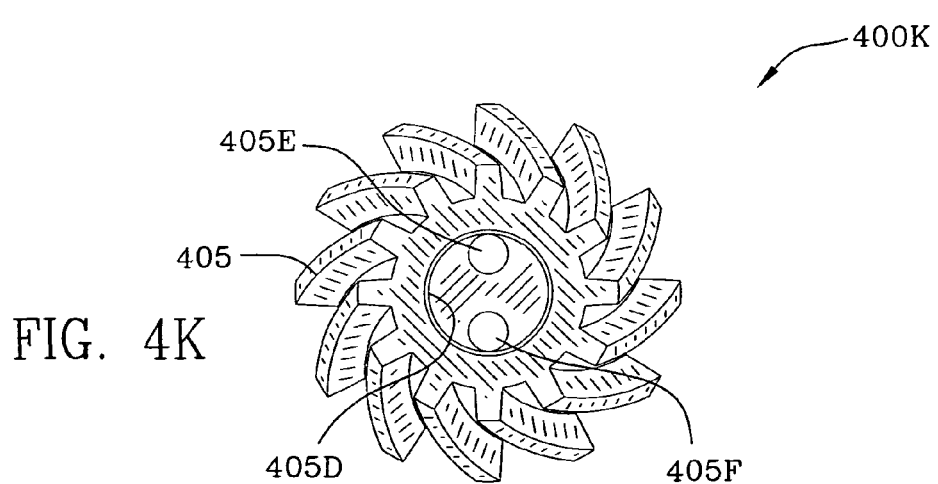
FIG. 4K is a view of the nose end of the pinion shaft and spiral bevel pinion.
Figure 4L:
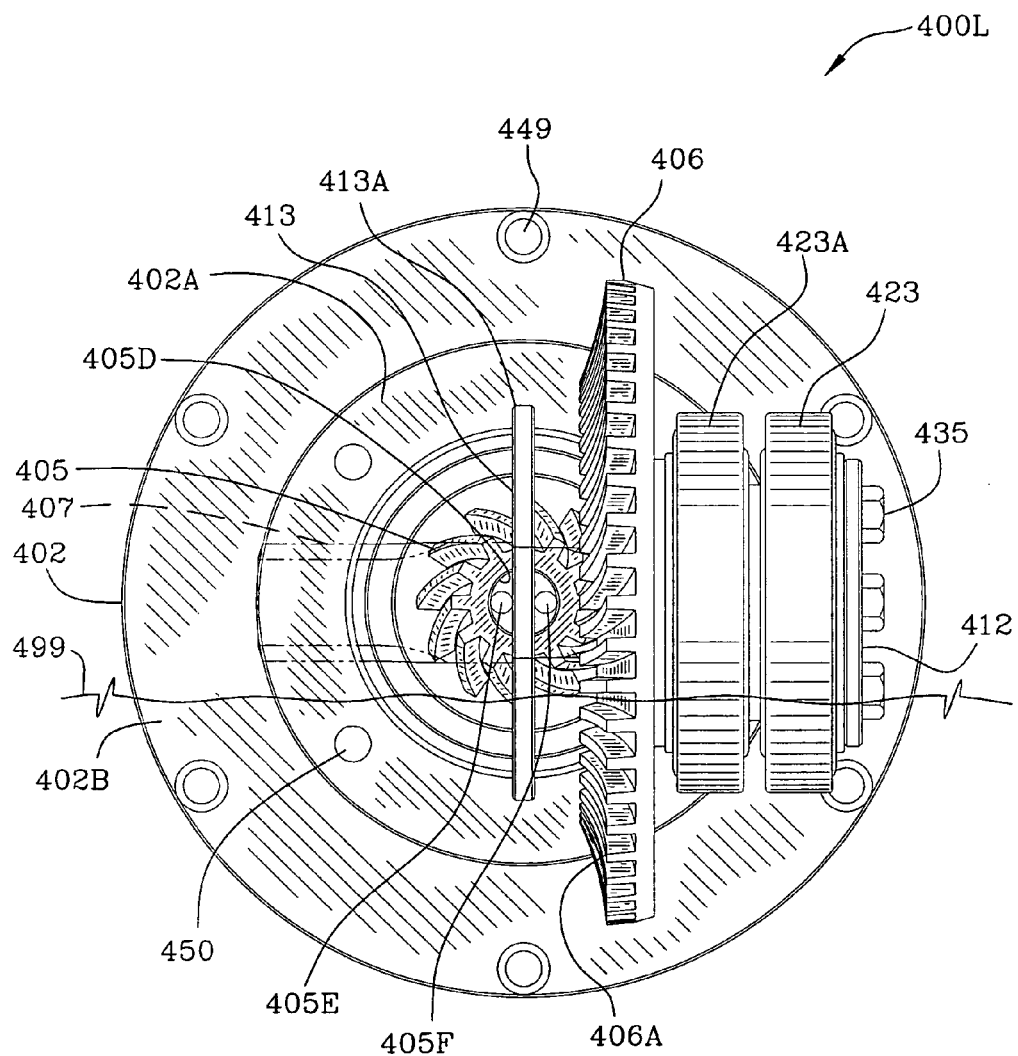
FIG. 4L is a cross-sectional view of the gear casing illustrating the spiral bevel pinion and the spinal bevel gear.

FIG. 4J is a top view 400J of the pinion shaft 405A and gear 405 and FIG. 4K is a view 400K of the nose end of the pinion shaft 405A and gear 405. Recess 405D and ports 405E and 405F are viewed in FIG. 4K.

FIG. 4L is a cross-sectional view 400L of the gear casing indicating shaft 407 in phantom driving oil slinger 413 which picks up oil 499 from the reservoir within the main housing 401 and deposits it into the rotating recess 405D of the pinion shaft 405A. Pinion spiral bevel gear teeth 405 intermesh with spiral bevel gear teeth 406A of gear 406 to effect a speed reduction. Bearing cones 423, 423A are illustrated for support of the shaft 407 as is bearing retention plate 412 and retention bolts 435.

FIG. 5 is a process flow chart 500 for lubricating bearings supporting a pinion shaft in a pinion shaft housing. A method for lubricating bearings supporting a pinion shaft in a pinion shaft housing is disclosed. The method includes the steps of: slinging oil from a lubricating oil reservoir using an oil slinger at a first end of a shaft 501; collecting oil in a cylindrical recess in the first end of the shaft 502; rotating the shaft and forcing the collected oil radially outwardly in the cylindrical recess and into a passageway communicating with the recess and extending longitudinally and radially from the recess to a chamber formed by said shaft, the bearings and a shaft housing 503; pumping oil from the chamber through the bearings 504; and, returning the oil to the lubricating oil reservoir 505. The step of returning the oil to the lubricating oil reservoir may be performed using a return passageway through the shaft housing. The step of rotating the shaft and forcing the collected oil radially outwardly in the cylindrical recess includes forcing the collected oil into a second passageway communicating with the recess and extending longitudinally and radially from the recess to the chamber formed by the shaft, the bearings and the shaft housing.

FIG. 6 is a process flow chart 600 for using high speed motors in a utility vehicle with right angle planetary gear reducers. A method for using high-speed motors in a utility vehicle is also disclosed and includes the steps of: orienting two high speed motors having shaft driven pinion gears parallel to the rails of the vehicle 601; mounting right angle planetary gear reducers in engagement with the shaft driven pinion gears 602, each of the planetary gear reducers include a gear driven by the shaft driven pinion gears, the gear driven by the shaft driven pinion gear includes a shaft portion formed as a second pinion gear which drives a planetary gear set and carrier reacting against a ring gear in the casing of the planetary gear reducer, the carrier of the planetary gear reducer includes a splined output, and each of the splined outputs being on the same axis; lubricating bearings supporting the pinion gear shafts with an oil slinger 603, the pinion gear shafts include a nose portion having a recess, at least one port, and at least one radially and longitudinally extending passageway communicating lubricating oil to a chamber feeding said lubricating bearings; pumping oil through the lubricating bearings and into a passageway for return to the right angle gear reducer 604; coupling an output shaft to the splined output of the planetary gear reducer and driving the output shaft at a desired rate 605; and, driving, with chains, the wheel shafts of the vehicle 606.

A list of reference numerals follows.

REFERENCE NUMERALS 14a-d—tires of vehicle
28—battery
60, 64—motor
62, 66—sides of vehicle
68, 84—coupling
70, 82—spur gear reduction assembly
72, 86—chain
74, 76, 88, 90—gears
78, 80, 92, 94—axles
70, 82—spur gear reduction assembly
100—prior art utility vehicle
200—utility vehicle
200A—enlarged portion of utility vehicle
200B—further enlargement of planetary gear reducer
200C—exploded view of powertrain
200D—perspective exploded view of carrier and output shaft
200E—perspective view of offset planetary gear reducer
201, 202—alternating current motor
203, 203A, 204—gearbox
205, 206—vehicle side wall
208, 214—output shafts
208B, 223B, 227B, 235B, 208C—bearing
208T—spline on output shaft
209, 211, 213, 215—drive chains
210, 212, 216, 217—wheel shaft
210A, 212A, 216A, 217A—wheel tire
221T—pinion teeth
221, 222—motor shaft pinion gear
221H—helical pinion
221S, 222S—motor shaft
223—gear
223H—helical gear
223B—bearing
223T—teeth on gear
224—stationary ring gear
224T—ring gear teeth
224S, 259S—seal
225, 226, 229—planet gear
225A—mesh between planet gear teeth 223T and ring gear teeth 224T
225P—pin
225T, 226T, 229T—planet gear teeth
227—sun pinion
227T—sun gear teeth
230—carrier
230T—spline on carrier
235—pin
240, 240A—bolt
241—pinion housing
250, 251—frame member
300—block diagram of method of using high speed motor and offset planetary gear reducers
301—orienting and mounting high speed motors side by side with pinions oppositely arranged
302—mounting offset planetary gear reducer in engagement with the shaft driven pinion gears
303—coupling an output shaft to the spined output at a desired rate
304—driving the wheel shifts of the vehicle
400—schematic of right angle drives used in skid-steer application
400A—cross-sectional schematic view of right angle drive
400B—perspective schematic view of right angle drive and motor
400C—perspective schematic view of pinion housing
400D—end schematic view of pinion housing
400E—cross-sectional view of pinion housing taken along line 4e-4e
400F—cross-sectional view of pinion housing taken along line 4f-4f
400G—cross-sectional view of pinion housing and pinion similar to FIG. 4e
400H—cross-sectional view of pinion housing and pinion similar to FIG. 4f
400I—perspective view of pinion gear and shaft
400J—orthogonal view of pinion gear and shaft
400K—front view of pinion gear 400L—exploded view of pinion housing and pinion gear and shaft
401—main housing
401A—spacer to interconnect right angle drive to vehicle side wall
402—pinion housing
402A—flange portion of pinion housing-motor connection
402B—flange portion of pinion housing-gear box connection
403—gear housing
404—gear housing cap
405—spiral bevel pinion gear teeth
405A—pinion shaft
405B—first passageway
405C—second passageway
405D—recess in pinion shaft
405E—port
405F—port
406—spiral bevel gear
406A—spiral bevel gear teeth
407—sun gear shaft
407A—press fit or threaded interconnection
408—planet gear
408T—planet gear teeth
409—ring gear
410—carrier
411—planet pin
412—spiral gear bearing retention plate
413—oil slinger disc
413A—outer circumference of oil slinger disc
414—sun gear shaft thrust plate
415—planet gear thrust washers
416—needle roller spacer
417—pinion housing shim pack
418—gear housing shim pack
419—spiral gear bearing shim pack
419A—bearing
419B—bearing
420—spiral pinion tapered bearing cones
420A—spiral pinion tapered bearing cones
421—spiral pinion tapered bearing cups
421A—spiral pinion tapered bearing cups
422—spiral gear tapered bearing cones
422A—spiral gear tapered bearing cones
423—spiral gear tapered bearing cups
423A—spiral gear tapered bearing cups
424—needle roller bearings
425—motor input seal
426—pinion housing o-ring
427—gear housing o-ring
428—gear housing cap o-ring
429—spiral pinion locknut
429A—threaded interconnection of spiral locknut to pinion shaft
430—spiral pinion tanged lockwasher
431—gear housing cap retaining ring
432—sun gear shaft retaining ring
433—roll pin
434—motor mounting bolts
435—pinion gear housing, bearing retention plate bolts
438—drain/fill/inspection plugs
439—inspection plugs with pipe threads
440—⅛ npt pipe plugs
440A—hole
441—¼ NPT pipe plugs
442—input bearing wave spring
445—spline
445A—sun gear teeth
446—pinion housing port
446A—pinion housing oil return passageway
446B—port in pinion shaft
447—pinion housing port
447A—pinion housing oil return passageway
447B—port in pinion shaft
448—pinion housing inner circumferential groove
449—bolt hole
450—bolt hole
451—tapered roller bearing
452—tapered roller bearing
453—oil chamber
454—oil chamber
455—spline on pinion shaft
455A—motor coupling
456—inner circumferential bearing stop
457—arrow indicating oil flow path
458—arrow indicating oil flow path
459—exterior slot in pinion shaft 405A
460—tang on lockwasher 429
466—groove in exterior of pinion shaft
471—flow arrow from oil slinger
476—spline
479—stop
481—spline
494—port
495—right angle drive assembly
495A—motor
496—right angle drive assembly
496A—motor
497—port
498—oil
499—oil level
500—process flow chart for lubricating bearings supporting a pinion shaft housing
501—slinging oil from a lubricating oil reservoir using an oil slinger at a first end of a shaft
502—collecting oil in a cylindrical recess in the first end of the shaft
503—rotating the shaft and forcing the collected oil radially outwardly in the cylindrical recess and into a passageway communicating with the recess and extending longitudinally and radially from the recess to a chamber
504—pumping oil from the chamber through the bearings
505—returning the oil to the lubricating oil reservoir
600—process flow chart for using high speed motor in a utility vehicle with right angle planetary gear reducers
601—orienting two high speed motors having shaft driven pinion gears parallel to the rails of the vehicle 601
602—mounting right angle planetary gear reducers in engagement with the shaft driven pinion gears
603—lubricating bearings supporting the pinion gear shafts with an oil slinger
604—pumping oil through the lubricating bearings and into a passageway for return to the right angle gear reducer
605—coupling an output shaft to the splined output of the planetary gear reducer and driving the output shaft at a desired rate
606—driving, with chains, the wheel shafts of the vehicle 606

The invention has been set forth by way of example with particularity. Those skilled in the art will readily recognize that changes may be made to the invention without departing from the spirit and the scope of the claimed invention.

The invention claimed is:

1. A wheel driven utility vehicle comprising:
a frame;
a high speed motor having an output shaft;

a right-angle gear reducer driven by said output shaft of said high speed motor; said right-angle gear reducer includes a bearing lubrication device comprising: a gear housing having an interior portion and a lubricating fluid reservoir therein; an oil slinger; a pinion shaft; said oil slinger oriented orthogonally with respect to said pinion shaft; a pinion shaft housing; a bearing for supporting said pinion shaft within said pinion shaft housing; said pinion shaft includes a first passageway therethrough; and, said oil slinger supplying oil to said first passageway communicating said oil to said bearing;

said right-angle gear reducer includes an output carrier interconnected with an output shaft;

said output shaft includes first and second chain drive sprockets;

forward and rearward wheel shafts each having a wheel sprocket;

a first and second chain;

said first chain interengaging said first chain drive sprocket and said forward wheel sprocket driving said forward wheel shaft; and, said second chain interengaging said second chain drive sprocket and said rearward wheel sprocket driving said rearward wheel shaft.

2. A wheel driven utility vehicle as claimed in claim 1 wherein said pinion shaft includes a second passageway therethrough for communicating oil to said bearing.

3. A wheel driven utility vehicle as claimed in claim 1 wherein said pinion shaft includes a first end portion; said first end portion includes a recess for receiving oil from said oil slinger; and, said first passageway communicates with said recess and said bearing.

4. A wheel driven utility vehicle as claimed in claim 2 wherein said pinion shaft includes a first end portion; said first end portion includes a recess for receiving oil from said oil slinger; and, said first and second passageway communicates with said recess and said bearing.

5. A wheel driven utility vehicle as claimed in claim 3 wherein said recess is cylindrically shaped.

6. A wheel driven utility vehicle as claimed in claim 4 wherein said recess is cylindrically shaped.

7. A wheel driven utility vehicle as claimed in claim 5 wherein said pinion shaft includes an exterior and said first passageway extends radially and longitudinally from said recess in said first end of said pinion shaft to said exterior of said pinion shaft.

8. A wheel driven utility vehicle as claimed in claim 6 wherein said pinion shaft includes an exterior and said first and second passageways extend radially and longitudinally from said recess in said first end of said pinion shaft to said exterior of said pinion shaft.

9. A wheel driven utility vehicle as claimed in 7 wherein said bearing lubrication device further includes a second bearing; a chamber formed between said bearings, said pinion shaft housing and said pinion shaft; and, said first passageway in communication with said chamber.

10. A wheel driven utility vehicle as claimed in 8 wherein said bearing lubrication device further includes a second bearing; a chamber formed between said bearings, said pinion shaft housing and said pinion shaft; and, said first and second passageways in communication with said chamber.

11. A wheel driven utility vehicle as claimed in 9 wherein said pinion shaft housing includes an interior and an exterior; said first bearing pumps oil from said chamber to said exterior of said pinion shaft housing and said second bearing pumps oil from said chamber to an oil return passageway communicating with said exterior of said pinion shaft housing.

12. A wheel driven utility vehicle as claimed in 10 wherein said pinion shaft housing includes an interior and an exterior; said first bearing pumps oil from said chamber to said exterior of said pinion shaft housing and said second bearing pumps oil from said chamber to an oil return passageway communicating with said exterior of said pinion shaft housing.

13. A method for using a high-speed motor in a utility vehicle, comprising the steps of:

orienting two high speed motors having shaft driven pinion gears parallel to the rails of the vehicle;

mounting right angle planetary gear reducers in engagement with each of said shaft driven pinion gears, each of said shaft driven pinion gears mounted on a pinion gear shaft, each of said planetary gear reducers includes a gear driven by a respective one of said shaft driven pinion gears, each said gear driven by said shaft driven pinion gear includes a shaft portion formed as a second pinion gear which drives a planetary gear set and carrier reacting against a ring gear in the casing of the planetary gear reducer, each of said carriers of said planetary gear reducers includes a splined output, and each of said splined outputs being on the same axis;

lubricating bearings supporting each of said pinion gear shafts with oil slingers, each of said oil slingers oriented orthogonally with respect to each of said pinion gear shafts, each of said pinion gear shafts include a nose portion having a recess, at least one port, and at least one radially and longitudinally extending passageway communicating lubricating oil to a chamber feeding said lubricating bearings;

pumping oil through said lubricating bearings and into pinion shaft housing passageways for return to said right angle gear reducers;

coupling an output shaft to each of said splined outputs of said planetary gear reducers and driving said output shafts at a desired rate; and, driving, with chains, said wheel shafts of said vehicle.

14. A method for using a high-speed motor in a utility vehicle as claimed in claim 13, wherein said step of lubricating bearings supporting said pinion gear shafts with oil slingers includes collecting oil in each said recess of each said nose of each said pinion shaft, each said recess being cylindrically shaped, and wherein said step of lubricating bearings further comprises rotating said pinion gear shafts and forcing said collected oil radially outwardly into each said cylindrical recess and into each of said passageways communicating with each said cylindrical recess, each of said passageways extending longitudinally and radially from each said recess to each said chamber, and, each of said chambers formed by said pinion gear shafts, said bearings and shaft housings.

* * * * *